(12) United States Patent
Beahan, Jr. et al.

(10) Patent No.: US 11,106,705 B2
(45) Date of Patent: Aug. 31, 2021

(54) SYSTEMS AND METHODS FOR PARSING OPAQUE DATA

(71) Applicant: ZestFinance, Inc., Los Angeles, CA (US)

(72) Inventors: John Joseph Beahan, Jr., Los Angeles, CA (US); Sean Javad Kamkar, Los Angeles, CA (US); Chris Rasario, Los Angeles, CA (US); Kalvin Huang, Los Angeles, CA (US); Amol Patil, Los Angeles, CA (US)

(73) Assignee: ZestFinance, Inc., Los Angeles, CA (US)

( * ) Notice: Subject to any disclaimer, the term of this patent is extended or adjusted under 35 U.S.C. 154(b) by 292 days.

(21) Appl. No.: 15/492,707

(22) Filed: Apr. 20, 2017

(65) Prior Publication Data

US 2017/0308520 A1   Oct. 26, 2017

Related U.S. Application Data

(60) Provisional application No. 62/325,123, filed on Apr. 20, 2016.

(51) Int. Cl.
*G06F 16/00* (2019.01)
*G06F 16/28* (2019.01)
*G06F 16/25* (2019.01)

(52) U.S. Cl.
CPC .......... *G06F 16/288* (2019.01); *G06F 16/254* (2019.01)

(58) Field of Classification Search
CPC .. G06F 16/288; G06F 16/254; G06F 17/2247; G06F 17/2705; G06F 17/272;
(Continued)

(56) References Cited

U.S. PATENT DOCUMENTS 5,999,938 A   12/1999  Bliss et al.
6,034,314 A    3/2000  Koike
(Continued)

FOREIGN PATENT DOCUMENTS

| WO | 014047 | 1/2014 |
| WO | 121019 | 8/2014 |
| WO | 056229 | 4/2015 |

OTHER PUBLICATIONS

International Preliminary Report on Patentability dated Aug. 4, 2015 in corresponding PCT Application No. PCT/US2014/014047.
(Continued)

*Primary Examiner* — Ashish Thomas
*Assistant Examiner* — Suman Rajaputra
(74) *Attorney, Agent, or Firm* — SyncIDS LLC

(57) ABSTRACT

Systems and methods for a multi-tenant parser generation platform. A human-readable document of a data provider system is accessed. The document includes a data dictionary table for opaque data of the data provider system that has a first type. Data dictionary information of the data dictionary table is extracted, and a schema file is generated from the extracted information. The schema file defines a parsing process for parsing an opaque data record of the first. The first schema file specifies each field of the opaque data record of the first type. Parsing instructions are generated based on the schema file. The parsing instructions are for parsing an opaque data record of the first type provided by the data provider system into a set of data fields. The parsing instructions are provided to an entity system external to the platform. The first entity system is associated with a first platform account.

20 Claims, 19 Drawing Sheets

(58) Field of Classification Search
CPC .......... G06F 17/30864; G06F 17/3089; G06F 17/27; G06F 17/30
See application file for complete search history.

(56) References Cited

U.S. PATENT DOCUMENTS

| | | | |
|---|---|---|---|
| 6,877,656 B1 | 4/2005 | Jaros et al. |
| 7,035,811 B2 | 4/2006 | Gorenstein |
| 7,280,980 B1 | 10/2007 | Hoadley et al. |
| 7,499,919 B2 | 3/2009 | Meyerzon et al. |
| 7,542,993 B2 | 6/2009 | Satterfield et al. |
| 7,711,635 B2 | 5/2010 | Steele et al. |
| 7,765,151 B1 | 7/2010 | Williams et al. |
| 7,873,535 B2 | 1/2011 | Umblijs et al. |
| 7,873,570 B2 | 1/2011 | Cagan et al. |
| 7,921,359 B2 | 4/2011 | Friebel et al. |
| 7,941,363 B2 | 5/2011 | Tanaka et al. |
| 7,941,425 B2 | 5/2011 | Sahu et al. |
| 7,970,676 B2 | 6/2011 | Feinstein |
| 7,987,177 B2 | 7/2011 | Beyer et al. |
| 7,996,392 B2 | 8/2011 | Liao et al. |
| 8,078,524 B2 | 12/2011 | Crawford et al. |
| 8,086,523 B1 | 12/2011 | Palmer |
| 8,166,000 B2 | 4/2012 | Labrie et al. |
| 8,200,511 B2 | 6/2012 | Zizzamia et al. |
| 8,219,500 B2 | 7/2012 | Galbreath et al. |
| 8,335,741 B2 | 12/2012 | Kornegay et al. |
| 8,442,886 B1 | 5/2013 | Haggerty et al. |
| 8,452,699 B2 | 5/2013 | Crooks |
| 8,515,842 B2 | 8/2013 | Papadimitriou |
| 8,554,756 B2 | 10/2013 | Gemmell et al. |
| 8,560,436 B2 | 10/2013 | Ingram et al. |
| 8,600,966 B2 | 12/2013 | Kravcik |
| 8,645,417 B2 | 2/2014 | Groeneveld et al. |
| 8,694,401 B2 | 4/2014 | Stewart |
| 8,744,946 B2 | 6/2014 | Shelton |
| 8,799,150 B2 | 8/2014 | Annappindi |
| 9,047,392 B2 | 6/2015 | Wilkes et al. |
| 9,268,850 B2 | 2/2016 | El-Charif et al. |
| 9,405,835 B2 | 8/2016 | Wheeler et al. |
| 9,686,863 B2 | 6/2017 | Chung et al. |
| 2002/0038277 A1 | 3/2002 | Yuan |
| 2002/0091650 A1 | 7/2002 | Ellis |
| 2002/0178113 A1 | 11/2002 | Clifford et al. |
| 2004/0068509 A1 | 4/2004 | Garden et al. |
| 2004/0199456 A1 | 10/2004 | Flint et al. |
| 2005/0055296 A1 | 3/2005 | Hattersley et al. |
| 2005/0278246 A1 | 12/2005 | Friedman et al. |
| 2006/0083214 A1 | 4/2006 | Grim et al. |
| 2006/0112039 A1 | 5/2006 | Wang |
| 2007/0011175 A1* | 1/2007 | Langseth ............... G06F 16/254 |
| 2007/0016542 A1 | 1/2007 | Rosauer et al. |
| 2007/0112668 A1 | 5/2007 | Celano et al. |
| 2007/0124236 A1 | 5/2007 | Grichnik et al. |
| 2008/0133402 A1 | 6/2008 | Kurian et al. |
| 2008/0208820 A1 | 8/2008 | Usey et al. |
| 2008/0307006 A1 | 12/2008 | Lee et al. |
| 2010/0010878 A1 | 1/2010 | Pinto et al. |
| 2010/0082476 A1 | 4/2010 | Bowman |
| 2011/0178902 A1* | 7/2011 | Imrey ................... G06Q 40/00 705/30 |
| 2012/0053951 A1 | 3/2012 | Kowalchuk et al. |
| 2012/0072029 A1 | 3/2012 | Persaud et al. |
| 2013/0138553 A1 | 5/2013 | Nikankin et al. |
| 2014/0081832 A1 | 3/2014 | Merrill et al. |
| 2014/0122355 A1 | 5/2014 | Hardtke et al. |
| 2014/0180790 A1 | 6/2014 | Boal |
| 2015/0161098 A1* | 6/2015 | Granshaw ............... G06F 40/14 707/755 |
| 2015/0347485 A1 | 12/2015 | Cai et al. |
| 2016/0371238 A1* | 12/2016 | Heavenrich ........... G06F 40/151 |
| 2017/0220633 A1* | 8/2017 | Porath ................... G06F 9/542 |

OTHER PUBLICATIONS

International Search Report dated May 5, 2014 in corresponding PCT Application No. PCT/US2014/014047.
Gehrlein, William et al., A two-stage least cost credit scoring model, 1997, Annals of Operations Research, pp. 159-171.

* cited by examiner

501

(a)

502

(b)

701

```
{
    "RecordType" : {
        "type" : "character",
        "begin" : 1,
        "end" : 2
    },
    "ByteCount" : {
        "type" : "integer",
        "begin" : 3,
        "end" : 5
    },
    "RecordIndex" : {
        "type" : "integer",
        "begin" : 6,
        "end" : 8
    },
    "ActivityType" : {
        "type" : "character",
        "begin" : 9,
        "end" : 11
    },
    "Year" : {
        "type" : "integer",
        "begin" : 12,
        "end" : 15
    }
}
```

| Record Type | 1-2 | Character |
| Byte Count | 3-5 | Integer |
| Record Index | 6-8 | Integer |
| Zip Code | 9-13 | Integer |
| Credit Score | 14-16 | Integer |

1203

Field Name, Type, Begin, End
RecordType, "character", 1, 2
ByteCount, "Integer", 3, 5
RecordIndex, "Integer", 6, 8
ZipCode, "Integer", 9, 13
CreditScore, "Integer", 14, 16

1204

| Key | Value | Data Type |
|---|---|---|
| Record Type | "CR" | Character |
| Byte Count | 16 | Integer |
| Record Index | 001 | Integer |
| Zip Code | 90272 | Integer |
| Credit Score | 760 | Integer |

SYSTEMS AND METHODS FOR PARSING OPAQUE DATA

CROSS-REFERENCE TO RELATED APPLICATIONS

This application claims the benefit of U.S. Provisional Application Ser. No. 62/325,123, filed on 20 Apr. 2016, which is incorporated in its entirety by this reference.

TECHNICAL FIELD

This disclosure relates generally to the Decision Support System (DSS) field, and more specifically to a new and useful system and method for pre-processing data streams to by analyzed by a DSS.

BACKGROUND

Decision support systems (DSS) perform data analysis to help users make informed decisions. In general, a DSS retrieves information from a data warehouse, analyzes the information in accordance with user specifications, and publishes the analysis results in a format that users can use to make informed decisions.

BRIEF DESCRIPTION OF THE FIGURES

FIG. 7 is an exemplary schema generated for a data dictionary for a non-self-documenting input format, in accordance with embodiments;

DESCRIPTION OF EMBODIMENTS

1. Overview

There is a need in the Decision Support System (DSS) field to create new and useful systems and methods for pre-processing information retrieved by a DSS before the DSS analyzes the retrieved information. This disclosure provides such new and useful systems and methods.

1.1 Pre-Processing

Pre-processing raw, opaque data (e.g., raw data records provided by a data provider) that includes a plurality of data fields includes using a data parsing module (e.g., 111 of FIGS. 2A, 2B) to parse the raw data to identify the data fields of each raw data record (e.g., reduce a record of raw data into a set of data fields).

1.2 Self-Describing Data

Figure 4:
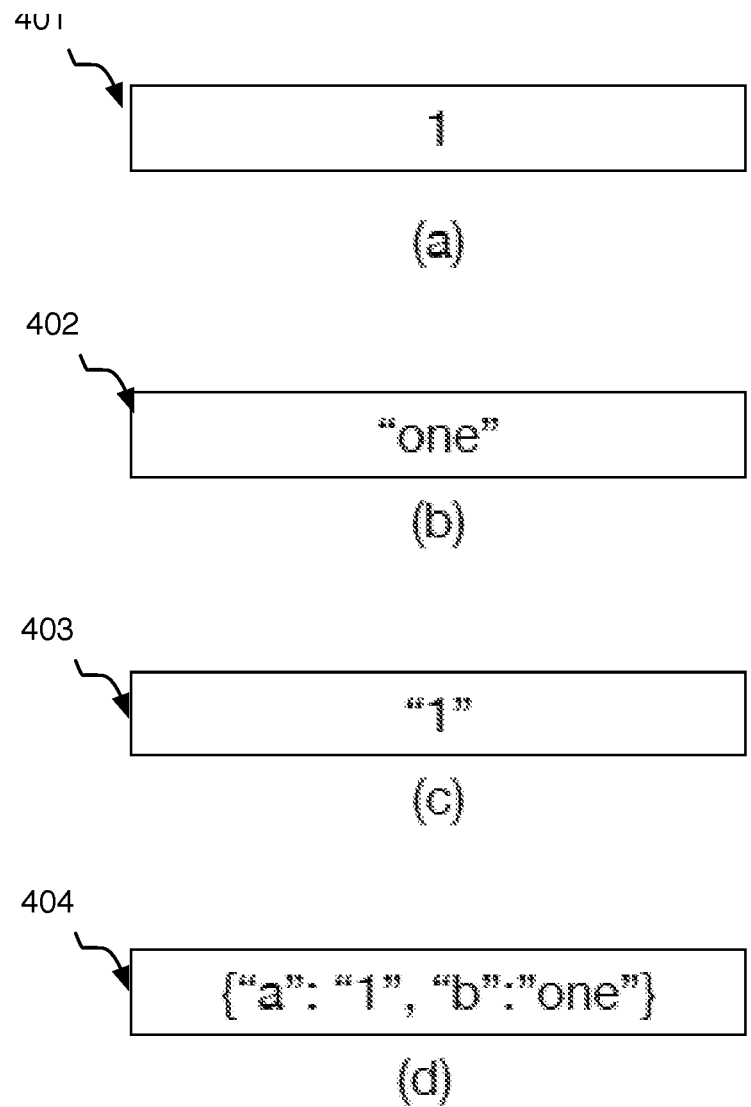
FIG. 4 is a depiction of exemplary self-documenting input formats.

A data provider can provide raw data records as data records having a self-describing data format (e.g., comma-separated value (CSV), XML, etc.) (e.g., data 401-404 of FIG. 4). In a case of raw data having a self-describing data format, a data parsing module can be constructed from the raw data itself. As an example, a CSV record is parsed by splitting the record of raw data at commas. As an example, a JSON blob describes its own structure in a set of key-value pairs. As an example, an XML blob describes its own structure as a nested set of smaller XML elements of atomic data fields.

1.3 Opaque Data

Figure 5:
FIG. 5 is a depiction of exemplary non-self-documenting input formats.
Figure 5:
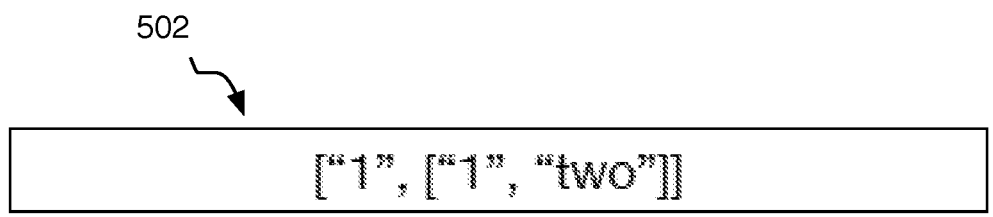

A data provider can provide raw data records as opaque data records that do not have a self-describing data format (e.g., data 501 and 502 of FIG. 5). Opaque data records include, for example, data records in a fixed field format (FFR), a raw data stream of opaque bytes, a speech signal, and the like. In a case of opaque raw data records, a data parsing module is constructed outside the raw data record stream itself (in embodiments described herein, a parser generation process is performed to generate the data parsing module (or a sub-module of the data parsing module) that parses opaque data records, and such a parser generation process involves parsing a data dictionary to construct a schema that is used to parse opaque data records received from the data provider). In some embodiments, a structure of the opaque data record is not provided by the record itself. In some embodiments, a structure of the opaque data record is not provided by the record itself, and the data dictionary provides the structure of the opaque data record.

In some arrangements, a data provider system (e.g., a credit reporting agency) can provide a data dictionary (that is associated with the opaque data provided by the data provider system) to a consuming system that consumes the opaque data. Such a data dictionary describes a layout of the opaque data (e.g., which bytes of an opaque record correspond to which fields) along with each element's (or data field's) type. Accordingly, an operator of a consuming system can use a programming language to program a parsing system for the opaque data of the data provider system by using the associated data dictionary. The performance of such a parsing system can be dependent on the accuracy of the data dictionary, the data dictionary capturing all fields (e.g., specifying a data field for each byte of an opaque data record) of opaque data records provided by the data provider system, and the operator properly interpreting the data dictionary. Such a parsing system might not be able to properly parse opaque data if there is a change in the fields of the opaque data (e.g., adding new fields, removing fields, etc.).

In some arrangements, the data dictionary is maintained by humans or some other error-prone system, and the contents of any given data dictionary record may include inaccuracies because the maintaining system initially entered incorrect data or because the data format changed or was updated but the data dictionary was not updated to reflect that change. It is helpful to detect these types of errors during the construction of the parsing system so that they can be remedied.

As an example, an exemplary data dictionary for a financial data source (e.g., one of the systems 131-136) (e.g., a credit reporting agency system) is an 700 page document in the Portable Document Format (ISO 32000-1:2008) (PDF). Many tens of tables (e.g., 70 tables) scattered through this PDF document define the raw data record format of opaque data records. Those tables are obscured within the PDF document by tens of thousands of lines of text that are intended for human consumption but are not used to construct the data parsing module (e.g., 111).

1.3.1 Schema-Based Parsing

Figure 6:
FIG. 6 is a table representing an exemplary data dictionary for a non-self-documenting input format.
Figure 12A:
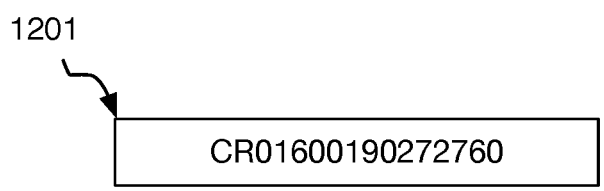
FIG. 12A is a depiction of an exemplary credit report opaque data record.
Figure 12B:
FIG. 12B is a depiction of an exemplary data dictionary for a credit report opaque data record.
Figure 12C:
FIG. 12C is a depiction of an exemplary schema generated for a credit report opaque data record, in accordance with embodiments.

In some embodiments, a schema that defines a parsing process for parsing opaque data records of the data provider is generated from a data dictionary of the data provider. Exemplary schemas are depicted in FIGS. 7 and 12C, and a corresponding data dictionary table from which each schema is constructed is depicted in FIGS. 6 and 12B (respectively).

In some implementations, the data dictionary is in a PDF format. In some implementations, information of each data dictionary table of the data dictionary is extracted from the PDF formatted data dictionary, and the extracted information is used to construct a schema corresponding to each data dictionary table, each data dictionary table representing a structure of a different record type provided by the data provider.

This schema is in a computer-readable format, whether stored in memory or in a self-describing file. The schema (file, or other representation of the structure) is included in a system (e.g., 100a-d) that consumes the data provided by the data provider system (e.g., 131-136). The schema is different from the opaque data records (e.g., 501 of FIG. 5, the record of FIG. 12A) provided by the data provider system. In other words, during communication of opaque data records from the data provider system to the data consuming system (e.g., 100a-100d), the schema is not transmitted from the data provider system to the data consuming system.

In some embodiments, an automatic parser generator module receives the schema and generates computer-readable program instructions of the data parsing module (or sub-module of the data parsing module) based on the received schema.

In some embodiments, the schema is provided to a data parsing model, and the data parsing module (e.g., 111) (or sub-module of the data parsing module) parses opaque data provided by the data provider system in accordance with the schema.

In some embodiments, the schema defines a structure of the opaque data records, and the data parsing module parses the opaque data records in accordance with the structure of the schema.

In some embodiments, the schema is a parser generator grammar. In some embodiments, the schema is different from a parser generator grammar.

1.3.2 Benefits of Opaque Data

By providing data records as opaque data, a data provider system (e.g., 131-136) may improve data density of the provided data. Reducing the size of raw data records is beneficial in several use cases. As example, in the case of a small, low-power sensor having a small battery (e.g., a sensor that is constructed to monitor the behavior of a pair of nesting California Condors), reducing the size of the raw data may reduce the rate of energy consumption of the small battery. As an example, in the case of an unmanned spacecraft at a great distance from Earth (in which data is communicated between Earth and the spacecraft in a noisy environment), reducing the size of the raw data may improve transmission efficiency. As an example, in the case of a credit report information (e.g., provided by a credit agency, such as Transunion, Experian, Equifax, and the like), reducing the size of the raw data may improve transmission efficiency of the data to a credit report information consuming system.

1.3.3 FFR Format

In embodiments, opaque data includes data in a fixed field format (FFR). An FFR record (or portion of an FFR record) (e.g., 501 of FIG. 5, 1201 of FIG. 12A) contains a byte length field, a field indicating the type of the record, and then the data in that record as a single un-delimited string of bytes. In embodiments, a data provider (e.g., one of the data provider systems 131-136 of FIGS. 1A-1D) emits many different types of FFR records. The FFR data format is used to improve data compactness because the FFR format does not utilize delimiters or other types of embedded parsing cues that are embedded in the raw data record itself, thereby adding extra padding to the record.

1.3.4 Parsing Opaque Data for Specific Fields

Parsing opaque data for data of a specific field can be performed based on a predetermined field identifier.

For example, data representing a credit score (e.g., a FICO score) can be identified from within a stream of bytes by performing a pattern matching process to identify a byte string that identifies credit score data. If a credit score is transmitted in the opaque data as 15 header bytes (e.g., "A00101190029298") followed by a 3 byte credit score (e.g., "650"), the credit score can be identified by searching for the header string and extracting the following three bytes as the credit score, provided that the header string is known in advance. In this manner, in a case where the credit score is included in an opaque data record that contains additional information (e.g., social security number, name, address, credit score, etc.), the pattern matching process can be used to identify the credit from such a data record even if the format of the data record is not known. In other words, a parser that is constructed to extract a credit score (or other data based on pattern matching using a known header identifier) might not be able to extract the additional information of the opaque data record. Furthermore, the opaque data might not include headers for each data field. Therefore, a pattern matching process might not extract all data of each data record of opaque data provided by a data provider.

1.3.5 Parsing Opaque Data to Identify and Use Data of Each Field of Each Opaque Data Record Embodiments herein for extracting data of each field of each record of opaque data involve use of a data dictionary (e.g., 1202 of FIG. 12B) that defines each opaque data record type as a string of bytes having a specified length, and that identifies which bytes of the string of bytes correspond to which data field. In some embodiments, the data dictionary identifies a data type for each data field. In some embodiments, a predetermined number of bytes starting with the first byte (e.g., first 2 bytes, first 4 bytes, etc.) of each record identify the record type of the opaque data record. In other words, the data dictionary defines the structure of each opaque data record. By converting the data dictionary (e.g., 1202 of FIG. 12B) into a structured schema (e.g., 1203 of FIG. 12C), and by performing parsing of opaque data records (e.g., 1204 of FIG. 12D) provided by the data provider (e.g., a credit agency system) in accordance with the structure defined by the schema, parsed data of each record of each opaque data record can be assigned to a particular field name (or variable name, or key name) as defined by the schema (and in some embodiments, assigned a computer data type as defined by the schema).

As described herein, a data dictionary (e.g., 1202 of FIG. 12B) provided by a data provider system night not be accurate. Accordingly, parsing opaque data can be improved by validating the data dictionary before generating the schema from the data dictionary.

Embodiments of this disclosure include systems and methods for parsing opaque data records to identify each data field of each opaque data record.

2. Summary of Embodiments

In some embodiments, a PDF document includes a data dictionary of a data provider system, and the data dictionary is represented in the PDF document as one or more tables (e.g., 601 of FIG. 6, 1202 of FIG. 12B) having a predetermined format. Each table defines at least one record format (e.g., credit report record format) of opaque raw data records (e.g., 501 of FIG. 5, 1201 of FIG. 12A) provided by the data provider system (e.g., a credit agency system). The record format defines data fields of at least one opaque raw data record. In some embodiments, tables of the data dictionary (e.g., 601 of FIG. 6, 1202 of FIG. 12B) are extracted from the PDF document, and the tables of the data dictionary are converted into at least one computer-readable data file (e.g., a CSV file).

Validity criteria is applied to each of the at least one computer-readable data files to generate at least one validated computer-readable data file.

A parser schema (e.g., 701 of FIG. 7, 1203 of FIG. 12C) is generated from the at least one validated computer-readable data file. In some embodiments, the generated parser schema is provided to an automatic parser generator module that generates computer-readable program instructions of the data parsing module based on the generated parser schema. In some embodiments, the generated parser schema is provided to a data parsing module (e.g., 111) that parses opaque data records in accordance with a structure defined by the generated parser schema.

In some embodiments, an Optical Character Recognition (OCR) parser is used to extract the tables of the data dictionary. In some embodiments, the Tabula application (e.g., the Tabula application found at http://tabula.technology/or https://github.com/tabulapdf/tabula) is used to extract the tables of the data dictionary. Tabula is an open source package which reads a PDF document and an indication of the location of a table within the PDF document and generates a file reflecting the indicated table. In some embodiments, each table extracted as a CSV file.

In some embodiments, the generated parsing schema is used by a data parsing module (e.g., the data parsing module 111) to parse opaque raw data records provided by the data provider system to identify a plurality of data fields included in the opaque raw data records, and provide the plurality of data fields (e.g., key-value pairs, Ruby hash, JSON blob representing a set of key-value pairs, and the like) to at least one decisioning engine that is constructed to generate decision information based on the plurality of data fields. The data parsing module is constructed to identify data fields in accordance with the record format indicated by the generated parser schema. In some embodiments, the opaque raw data records have an FFR format and the tables define the FFR record format of opaque raw data records.

In some implementations, key-value pairs are represented by a Ruby hash (e.g., a hash as defined by the Ruby programming language). In some implementations, key-value pairs are represented by a JSON (JavaScript Object Notation) blob. In some implementations, the representation of a set of key-value pairs is a JSON blob constructed by using the Python JSON module. In some implementations, a JSON blob representing each set of key-value pairs is generated directly from a Ruby hash.

In some embodiments, tables of the PDF document define the FFR record format of opaque data records provided by the data provider system. In some embodiments, each opaque data record (e.g., FIG. 501 of FIG. 5, 1201 of FIG. 12A) has: a byte length field, a field indicating the type of the record, and the data in that record as a single undelimited string. In some embodiments, each data dictionary table (e.g., 601 of FIG. 6, 1202 of FIG. 12B) of the PDF document is a human-readable table in the PDF format that defines at least one type of opaque data record of the data provider system by specifying which bytes of the record correspond to the byte length field, the type field, and each data field.

As the PDF document is typically maintained by a human, the document can contain errors. Any of the tables might be incorrectly formatted for any of several reasons: the field registration data might not be internally consistent, or the length of the record might not be the correct length, or the headers in the table might be wrong, or other similar issues. Accordingly, performing validation to detect such errors can improve accuracy of the process of parsing the opaque data records.

In some embodiments, the PDF document is provided by the data provider system (e.g., a credit agency system). In some embodiments, the PDF document is provided by a system external to the data provider system. In some embodiments, the PDF document is generated by the data provider system (e.g., the credit agency system). In some embodiments, the PDF document is generated by a system external to the data provider system. In some embodiments, the PDF document includes the data dictionary and additional information to be presented by a human presentation device, such as, for example, a display device, a printing device, and the like. In some embodiments, the additional information is intended for human consumption. In some embodiments, the additional information is different from the data dictionary. In some embodiments, the additional information is different from information used to parse opaque raw data records.

In some embodiments, methods disclosed herein are performed by the decisioning system (e.g., 100a, 100b, 100c, 100d). In some embodiments, methods disclosed herein are performed by a modeling client system (e.g., 141a-141d). In some embodiments, methods disclosed herein are performed by an entity system (e.g., 151b-153b, 151c, 151d-153d). In some embodiments, methods disclosed herein are performed by a data provider system (e.g., 131-136). In some embodiments, methods disclosed herein are performed by a decision information consuming system (e.g., 121a, 121b-123b, 121c, 121d-123d).

Embodiments of this disclosure include: 1) single-tenant decisioning systems (e.g., the system 100a of FIG. 1A), 2) multi-tenant decisioning systems (e.g., the system 100b of FIG. 1B), 3) single tenant decisioning platform systems (e.g., the system 100d of FIG. 1C), and 4) multi-tenant decisioning platform systems (e.g., the system 100d of FIG. 1D), and methods corresponding to the disclosed systems.

In some embodiments, such decisioning systems (e.g., the systems 100a-100d) are constructed to process input data (e.g., provided by a data provider system, such as one or more of the systems 131-136) to generate decision information. In some embodiments, such decisioning systems (e.g., the systems 100a-100d) are constructed to process input data (e.g., provided by a data provider system, such as one or more of the systems 131-136) to generate decision information responsive to a request provided by a consuming system (e.g., 121a, 121b-123b, 121c, 121d-123d). In some embodiments, the decisioning systems are constructed to provide decision information to a human user (e.g., operating one of the systems 121a, 151b-153b, 151c, 151d-153d) to aid the user in making an informed decision. In some embodiments, decisioning systems are constructed to provide decision information to a least one system (e.g., one of the systems 121a, 151b-153b, 151c, 151d-153d) that is constructed to perform at least one automated action responsive to decision information. In some embodiments, decisioning systems (e.g., the systems 100a-100d) are constructed to provide decision information to a consuming system (e.g., one of the systems 121a, 121b-123b, 121c, 121d-123d) in response to a request for decision information provided by the consuming system. In some embodiments, the consuming system provides input data with the request for decision information. In some embodiments, the consuming system is a consuming system of a lending system, and the input data provided with the request for decision information is borrower data received from a loan applicant, and the request for decision information is a request to the decisioning system to provide decision information that indicates whether to lend money to the borrower. In some embodiments, decisioning systems (e.g., the systems 100a-100d) include predictive analysis systems that use at least one predictive analytic model to generate decision information. In some embodiments, decisioning systems (e.g., the systems 100a-100d) include Decision Support Systems (DSS).

In some embodiments, the decisioning system (e.g., one of the systems 100a-100d) includes a parser generation system. In some embodiments, the decisioning system (e.g., one of the systems 100a-100d) is a parser generation system.

In some embodiments, the decisioning system (e.g., one of the systems 100a-100d) is a parser generation system that is constructed to generate data parsing instructions that when executed, generate data used to generate decision information. In some embodiments, the parser generation system is a multi-tenant parser generation system that manages a plurality of accounts. In some embodiments, the parser generation system is a multi-tenant parser generation platform system that manages a plurality of platform accounts.

In some embodiments, a data pre-processing module (e.g., 180a-d) of the decisioning system is a parser generation system.

Single-Tenant Systems

Figure 1A:
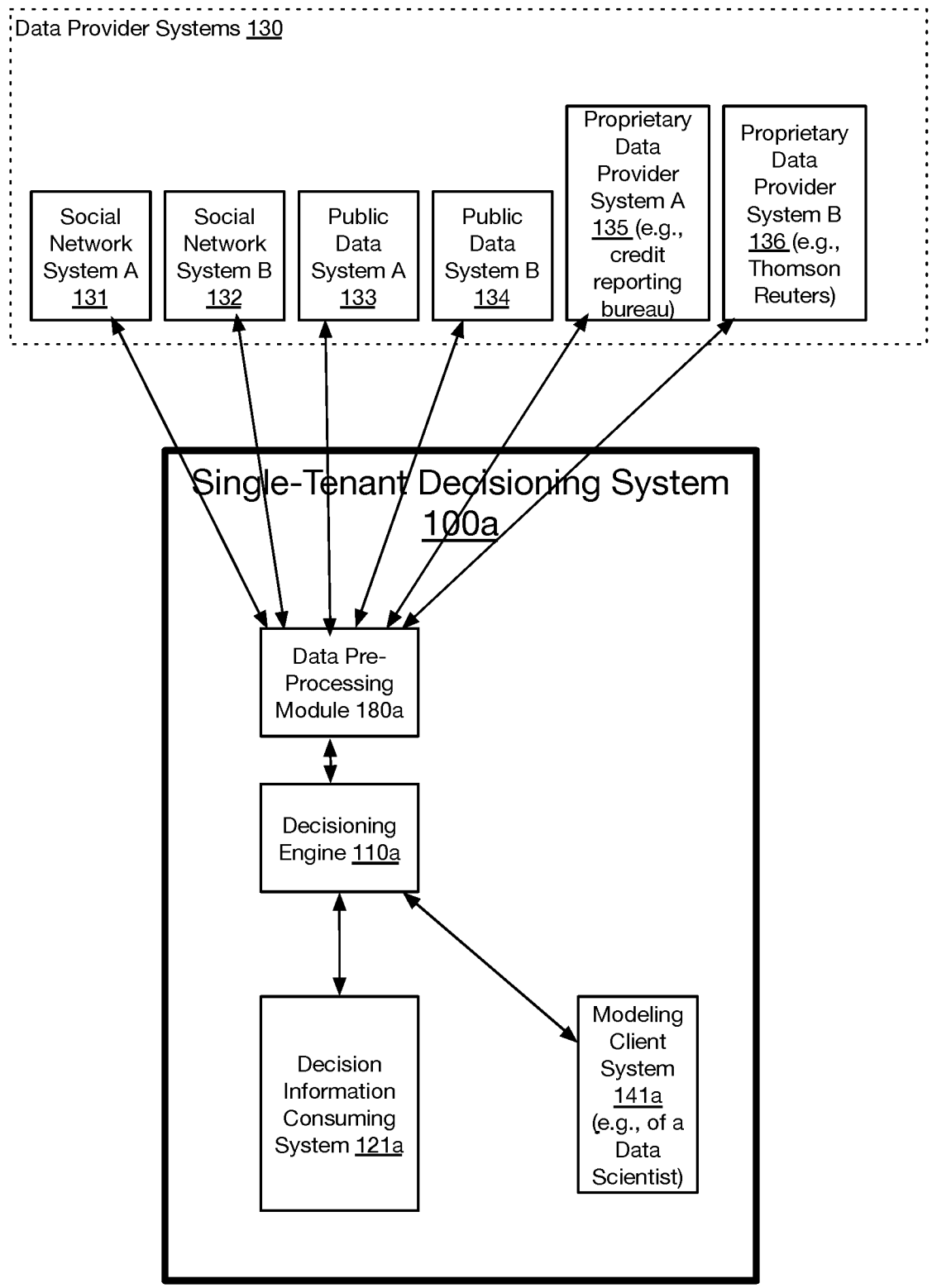
FIG. 1A is a schematic representation of a single-tenant decisioning system in accordance with embodiments.
Figure 1B:
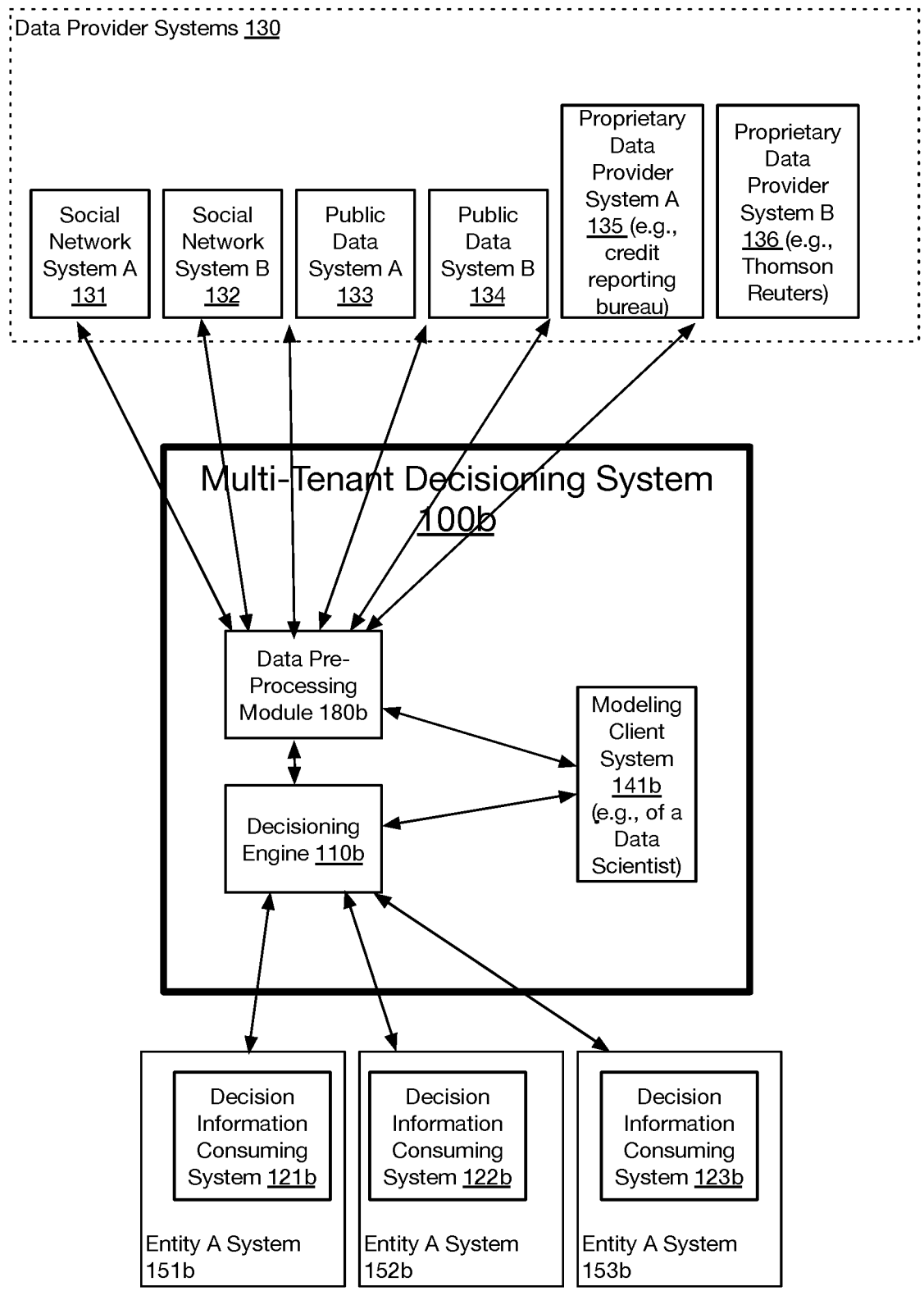
FIG. 1B is a schematic representation of a multi-tenant decisioning system in accordance with embodiments.
Figure 1C:
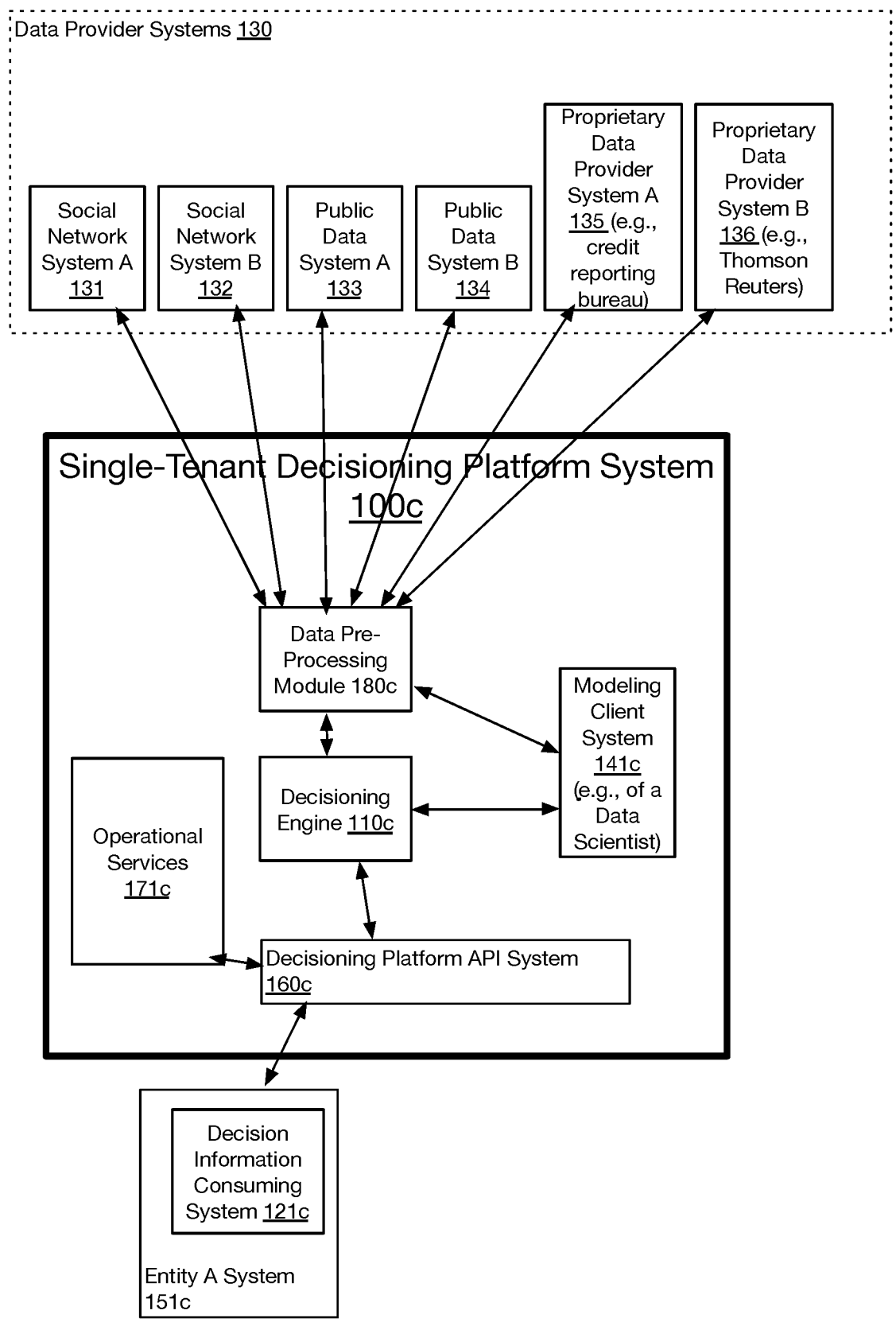
FIG. 1C is a schematic representation of a single-tenant decisioning platform system in accordance with embodiments.

In some embodiments, the system is a single-tenant system (a single tenant decisioning system 100a of FIG. 1A, a single-tenant decisioning system platform 100c of FIG. 1C). In some embodiments, the single-tenant system provides decision information to one decision information consuming system (e.g., 121a, 121c). In some embodiments, the decision information consuming system (e.g., 121a) is internal to the single-tenant system. In some embodiments, the decision information consuming system (e.g., 121c) is external to the single-tenant system.

Figure 2A:
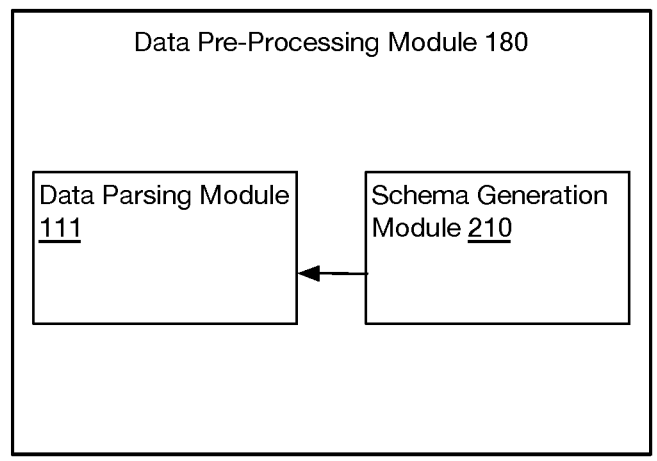
FIG. 2A is a schematic representation of data pre-processing module in accordance with embodiments.
Figure 2B:
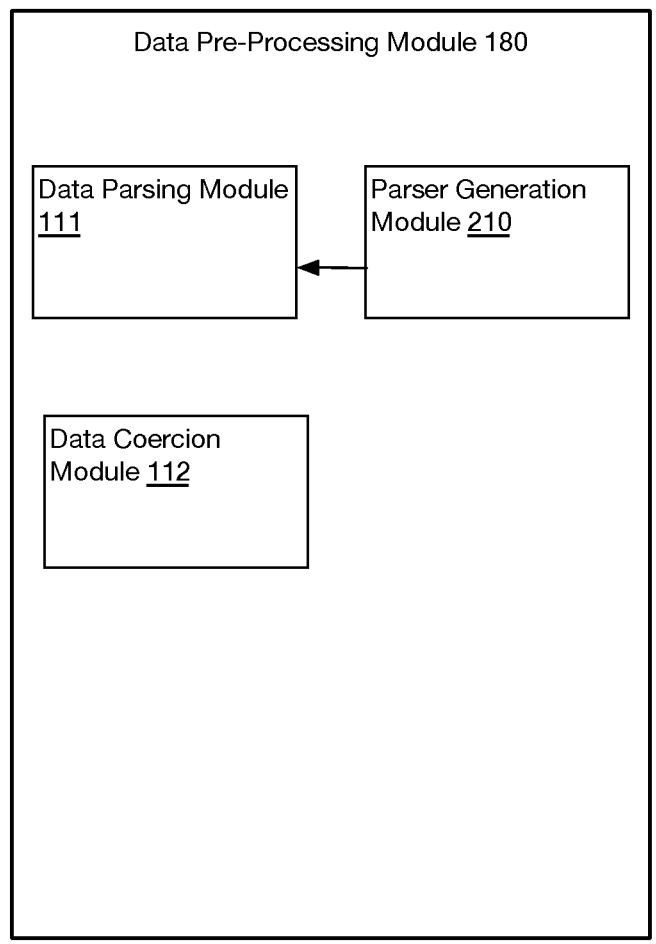
FIG. 2B is a schematic representation of data pre-processing module in accordance with embodiments.
Figure 3:
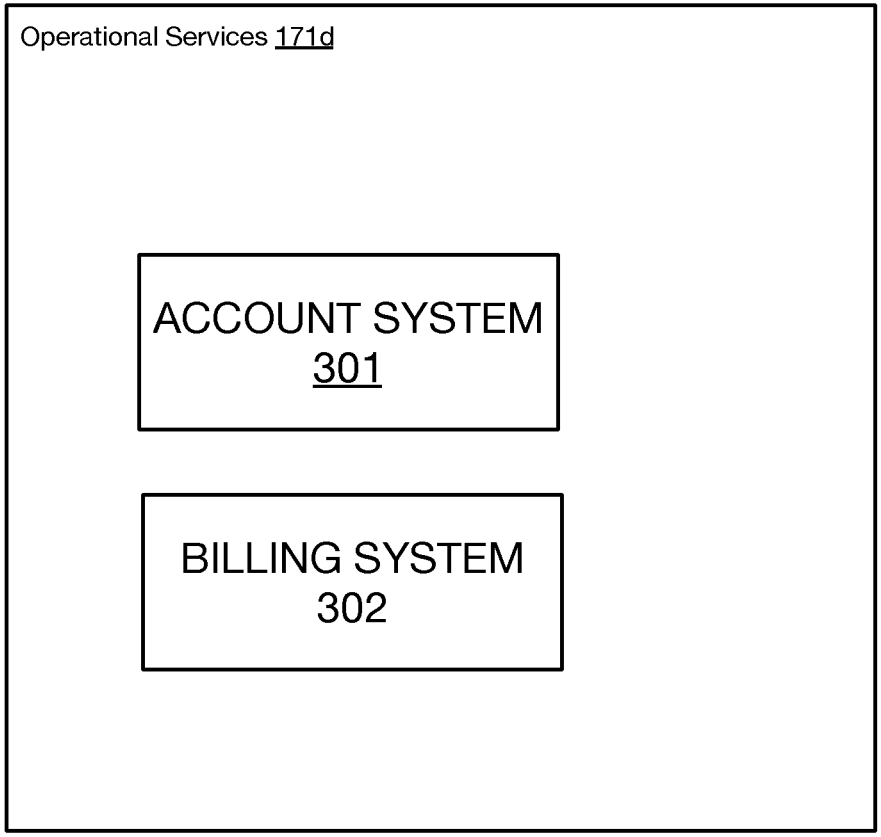
FIG. 3 is a schematic representation of an operational services system in accordance with embodiments.

In some embodiments, the single-tenant system provides machine-executable instructions (and related data) for a data parsing module (e.g., a data parsing module similar to the data parsing module 111 of FIGS. 2A and 2B) to an entity system (e.g., 151c). In some embodiments, the data pre-processing module 180c (FIG. 1C) provides machine-executable instructions (and related data) for a data parsing module (e.g., a data parsing module similar to the data parsing module 111 of FIGS. 2A and 2B) to an entity system (e.g., 151c) via the decisioning platform API System 160c. In some embodiments, the data pre-processing module 180c (FIG. 1C) is communicatively coupled to the decisioning platform API System 160c.

Multi-Tenant Systems

Figure 1D:
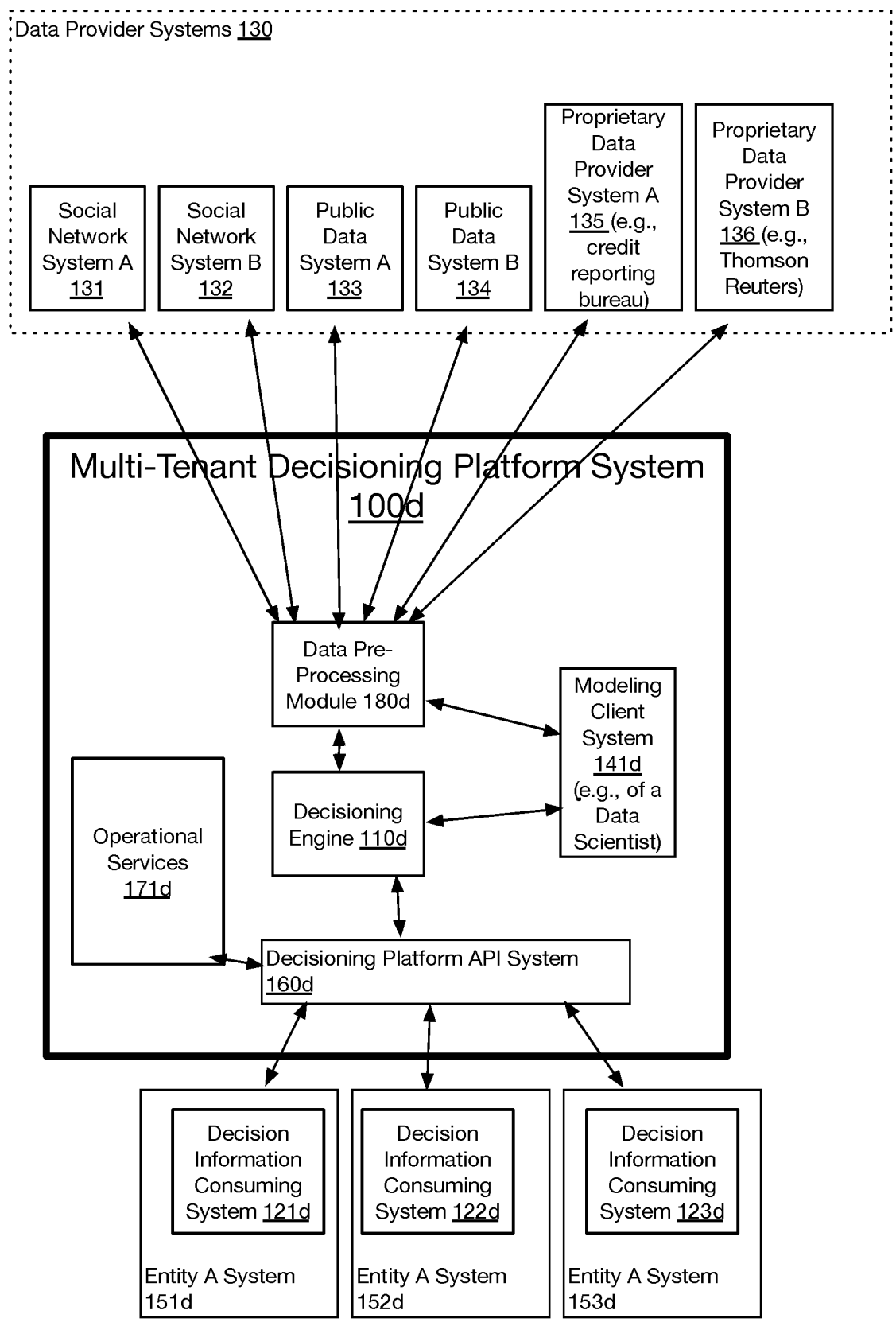
FIG. 1D is a schematic representation of a multi-tenant decisioning platform system in accordance with embodiments.

In some embodiments, the decisioning system is a multi-tenant system (a multi-tenant decisioning system 100b of FIG. 1B, a multi-tenant decisioning system platform 100d of FIG. 1D). In some embodiments, the multi-tenant system provides decision information to a plurality of decision information consuming systems (e.g. 121b-123b, 121d-123d). In some embodiments, the decision information consuming systems include at least one decision information consuming system that is internal to the multi-tenant system. In some embodiments, the decision information consuming systems include at least one decision information consuming system that is external to the multi-tenant system (e.g. 121b-123b, 121d-123d). In some embodiments, each consuming system is a system of an entity (e.g., multi-tenant system account holder, multi-tenant system sub-account holder) of the multi-tenant decisioning system (e.g. 121b-123b, 121d-123d).

In some embodiments, the multi-tenant system provides machine-executable instructions (and related data) for a data parsing module (e.g., a data parsing module similar to the data parsing module 111 of FIGS. 2A and 2B) to a plurality of entity systems (e.g., 151b-153b, 151d-153d). In some embodiments, the data pre-processing module 180b (FIG. 1B) provides machine-executable instructions (and related data) for a data parsing module (e.g., a data parsing module similar to the data parsing module 111 of FIGS. 2A and 2B) to a plurality of entity systems (e.g., 151b-153b, 151d-153d). In some embodiments, the data pre-processing module 180d (FIG. 1D) provides machine-executable instructions (and related data) for a data parsing module (e.g., a data parsing module similar to the data parsing module 111 of FIGS. 2A and 2B) to a plurality of entity systems (e.g., 151b-153b, 151d-153d) via the decisioning platform API System 160d. In some embodiments, the data pre-processing module 180d (FIG. 1D) is communicatively coupled to the decisioning platform API System 160d.

System Architecture:

In some embodiments, the decisioning system (e.g., one of the systems 100a-100d) includes at least one input data pre-processing module (e.g., 180a, 180b, 180c, 180d) and at least one decisioning engine (e.g., 110a-d).

System Architecture: Input Data Pre-Processing Modules

In some embodiments, each input data pre-processing module (e.g., 180a, 180b, 180c, 180d) is constructed to pre-process data retrieved by the decisioning system (e.g., 100a, 100b, 100c, 100d) from a respective data provider system (e.g., 131-136) and provide the pre-processed data to at least one decisioning engine (e.g., 110a-d) to generate decision information. In some embodiments, the decisioning system includes one input data pre-processing module (e.g., 180a, 180b, 180c, 180d) that includes a sub-module for at least one data provider system (e.g., 131-136), and each sub-module is constructed to pre-process data retrieved by the decisioning system (e.g., 100a, 100b, 100c, 100d) from a respective data provider system (e.g., 131-136) and provide the pre-processed data to at least one decisioning engine (e.g., 110a-d) to generate decision information.

In some embodiments, at least one input data pre-processing module includes a data parsing module (e.g., the data parsing module 111 of FIG. 2A). In some embodiments, the decisioning system includes one input data pre-processing module that includes a data parsing module (e.g., the data parsing module 111 of FIG. 2A), and the data parsing module includes a sub-module for at least one data provider system (e.g., 131-136), and each sub-module is constructed to parse data retrieved by the decisioning system (e.g., 100a, 100b, 100c, 100d) from a respective data provider system (e.g., 131-136) and provide the parsed data to at least one decisioning engine (e.g., 110a-d).

In some embodiments, at least one input data pre-processing module includes a data coercion module (e.g., the data coercion module 112 of FIG. 2B). In some embodiments, at least one input data pre-processing module is generated based on information provided by a data modelling client system (e.g., 141a-d of FIGS. 1A-1D, respectively). In some embodiments, the decisioning system includes one input data pre-processing module that includes a data coercion module (e.g., the data coercion module 112 of FIG. 2B), and the data coercion module includes a sub-module for at least one data provider system, and each sub-module is constructed to coerce data retrieved by the decisioning system from a respective data provider system and provide the coerced data to at least one decisioning engine (e.g., 110a-d).

In some embodiments, at least one input data pre-processing module is generated based on information provided by a data modelling client system (e.g., 141a-d of FIGS. 1A-1D, respectively). In some implementations, the data modelling client system is operated by a human that performs the role of data modeler or data scientist. In some embodiments, the decisioning system (e.g., 100a, 100b, 100c, 100d) includes at least one input data pre-processing module (e.g., 111) for at least one data provider system (e.g., 131-136) used by the decisioning system (e.g., 100a, 100b, 100c, 100d).

In some embodiments, at least one input data pre-processing module (e.g., 180a-d) includes a schema generation module (e.g., 210 of FIGS. 2A and 2B) that is constructed to generate the data parsing module (e.g., the data parsing module 111 of FIGS. 2A and 2B).

In some embodiments, the decisioning system includes one input data pre-processing module that includes a schema generation module (e.g., 210 of FIGS. 2A and 2B), and the schema generation module includes a sub-module for at least one data provider system, and each sub-module is constructed to generate a data parsing module (e.g., the data parsing module 111 of FIGS. 2A and 2B) for the respective data provider system.

In some embodiments, the decisioning system includes one input data pre-processing module that includes a schema generation module (e.g., 210 of FIGS. 2A and 2B), and the schema generation module includes a sub-module for a plurality of data provider systems, and each sub-module is constructed to generate a data parsing schema for the respective data provider system and provide the generated schema to the data parsing sub-module (e.g., a sub-module of 111) for the respective data provider system.

In some embodiments, the schema generation module 210 includes a schema generation sub-module for schema generation for at least one data provider system (e.g., a credit agency system). In some embodiments, the schema generation module 210 includes plurality of schema generation sub-modules, each sub-module constructed for schema generation for a respective data provider system. In some embodiments, the data parsing module 111 includes a parsing sub-module for parsing for each data provider system. In some embodiments, the data parsing module 111 includes a parsing sub-module for parsing for at least one data provider system. In some embodiments, the data parsing module 111 includes a parsing sub-module for parsing for a plurality of data provider systems.

Figure 11:
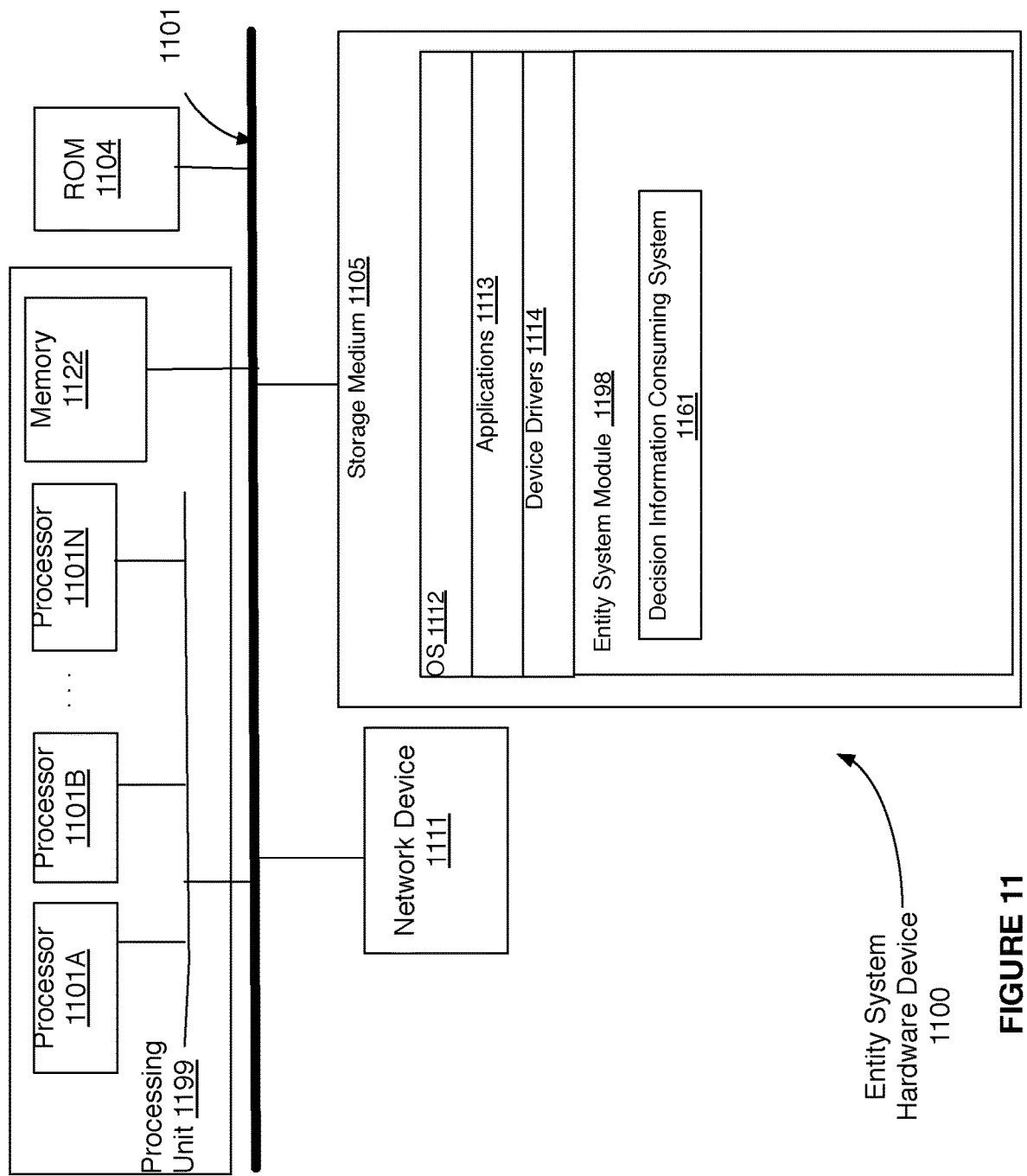
FIG. 11 is an architecture diagram of an entity system in accordance with embodiments.

In some embodiments, an input data pre-processing module (e.g., 180a, 180b, 180c, 180d) is constructed to generate machine-executable instructions (and related data) for a data parsing module (e.g., a data parsing module similar to the data parsing module 111 of FIGS. 2A and 2B) and provide the instructions of the data parsing module to an entity system (e.g., 151b-153b, 151c, 151d-153d of FIGS. 1B-1D, 1100 of FIG. 11).

System Architecture: Decisioning Engine

In some embodiments, each decisioning engine (e.g., 110a-d) is constructed to generate decision information based on pre-processed data received from at least one input data pre-processing module (e.g., 180a, 180b, 180c, 180d). In some embodiments, each decisioning engine is constructed to generate decision information based on raw data received from at least one data provider system (e.g., 131-136). In some implementations, the decisioning system (e.g., 100a, 100b, 100c, 100d) includes one decision module, and the decision module is constructed to provide the generated decision information to at least one decision information consuming system (e.g., 121a, 121b-123-b, 121c, 121d-123d). In some implementation, the decisioning system (e.g., 100a, 100b, 100c, 100d) includes a plurality of decision modules, and at least one decision module is constructed to provide the respective generated decision information to at least one of the plurality of decision modules, and at least one decision module is constructed to provide the respective generated decision information to at least one decision information consuming system (e.g., 121a, 121b-123-b, 121c, 121d-123d).

Platforms

In some embodiments, the decisioning system (e.g., 100a, 100b, 100c, 100d) is a decisioning system platform that provides at least one Application Program Interface (API) (e.g., 160*c* of FIG. 1C, 160*d* of FIG. 1D) for communication with at least one of a data provider system (e.g., 131-136), a decision information consuming system (121*a*, 121*b*-123*b*, 121*c*, 121*d*-123*d*), an entity system (e.g., 151*b*-152*b*, 151*c*, 151*d*-153*d* of FIGS. 1B-D, 1100 of FIG. 11), and a data modelling client system (e.g., 141*a*-141*d*). In some implementations, at least one of the API's is a RESTful API.

Entity Systems

In some embodiments, an entity system (e.g., 151*b*-153*b*, 151*c*, 151*d*-153*d*) includes machine-executable instructions (and related data) for a decisioning engine (e.g., a decisioning engine similar to the decisioning engines 110*a*-*d* of FIGS. 1A-D). In some embodiments, the entity system includes machine-executable instructions (and related data) for a data parsing module (e.g., a data parsing module similar to the data parsing module 111 of FIGS. 2A and 2B). In some embodiments, the entity system includes machine-executable instructions (and related data) for a decisioning engine (e.g., a decisioning engine similar to the decisioning engines 110*a*-*d* of FIGS. 1A-D), the entity system includes machine-executable instructions (and related data) for a data parsing module (e.g., a data parsing module similar to the data parsing module 111 of FIGS. 2A and 2B), and the instructions of the decisioning engine include instructions that when executed by the entity system, control the entity system to execute the instructions of the data parsing module. In some embodiments, the decisioning system (e.g., 100, 100*a*-*d*) provides the instructions of the data parsing module to the entity system. In some embodiments, the decisioning system (e.g., 100, 100*a*-*d*) provides updated data parsing module instructions to the entity system 1100. In some embodiments, an input data pre-processing module (e.g., 180*a*, 180*b*, 180*c*, 180*d*) of the decisioning system (e.g., 100, 100*a*-*d*) provides the instructions of the data parsing module to the entity system. In some embodiments, an input data pre-processing module (e.g., 180*a*, 180*b*, 180*c*, 180*d*) of the decisioning system (e.g., 100, 100*a*-*d*) provides updated data parsing module instructions to the entity system. In some embodiments, the decisioning system (e.g., 100, 100*a*-*d*) generates updated data parsing module instructions responsive to a determination that the corresponding data dictionary information (e.g., information depicted in FIG. 12B) has changed, and provides updated data parsing module instructions to the entity system (e.g., 1100 of FIG. 11). In some embodiments, the decisioning system determines whether the data dictionary information has changed by comparing newly received data dictionary information with previously received data dictionary information.

Decision Information Consuming Systems

In some embodiments, decision information consuming systems (e.g., 121*a*, 121*b*-123*b*, 121*c*, 121*d*-123*d*) include at least one of internal decision information consuming systems (e.g., 121*a*) and external decision information consuming systems (e.g., 121*b*-123*b*, 121*c*, 121*d*-123*d*). In some embodiments, decision information consuming systems include decision information consuming systems for at least one of: loan application underwriting decisions, on-line advertising bidding decisions, autonomous vehicle (e.g., self driving car, aircraft, drone, etc.) decisions, visual avoidance decisions (e.g., for visual avoidance systems of an autonomous vehicle), business decisions, financial transaction decisions, robot control decisions, artificial intelligence decisions, and the like. In some embodiments, the decisioning system (e.g., 100*a*, 100*b*, 100*c*, 100*d*) is constructed to be configurable to provide decision information for any type of decision making process.

In some embodiments, at least one decision information consuming system (or entity system, e.g., systems 151*b*-153*b*, 151*c*, 151*d*-153*d*) is constructed to provide configuration information to the decisioning system (e.g., 100*a*, 100*b*, 100*c*, 100*d*), and the decisioning system is constructed to generate decision information for the decision information consuming system based on the configuration information. In some embodiments, the configuration information includes modeling information provided by a modelling client system of the decision information consuming system (e.g., a modelling client system of one of the systems 151*b*-153*b*, 151*c*, 151*d*-153*d*). In some implementations, the configuration information is provided via an API (e.g., one of the API's 160*c*, 160*d*).

In some implementations, the configuration information specifies a use for the decision information. In some implementations, the configuration information specifies a type of the decision information. In some implementations, the configuration information specifies a decisioning pipeline (e.g., a pipeline of one or more decision modules of the decisioning engine, e.g., 110*a*-*d*) that is used to generate the decision information. In some implementations, the configuration information for each decisioning pipeline specifies at least one of: an input data source, a decision module, a chaining module that is constructed to chain an output of a decision module to an input of another decision module, an output destination for the decision information (e.g., a callback URI), and an action rule that maps an action to be performed to a decision information value.

Data Provider Systems

In some embodiments, the data provider systems 130 include at least one of an external public data system, an external proprietary data provider system (e.g., a credit agency, Thomson Reuters, Bloomberg, and the like), an external social network system, the decisioning system (e.g., in an implementation where the decisioning system provides internal data for use in the decisioning process), a user system of a user of the decisioning system (e.g., a user system that provides user data received from the user via user input). In some implementations, in a case in which the decision information is for underwriting loan applications, input data includes loan application data (e.g., borrower data) provided by a user of a borrower device that is requesting a loan based on the decision information.

In some implementations, input data includes data provided by at least one external system (e.g., 151*b*-153*b*, 151*c*, 151*d*-153*d*) of an entity (e.g., decisioning platform account holder, decisioning platform sub-account holder).

Operational Services

In some embodiments, the operational services 171*c* and 171*d* of FIGS. 1C and 1D of the multi-tenant systems 100*c* and 100*d*, respectively, include at least one of an account system and a billing system for managing accounts (and sub-accounts) of the multi-tenant systems.

Methods

Figure 8:
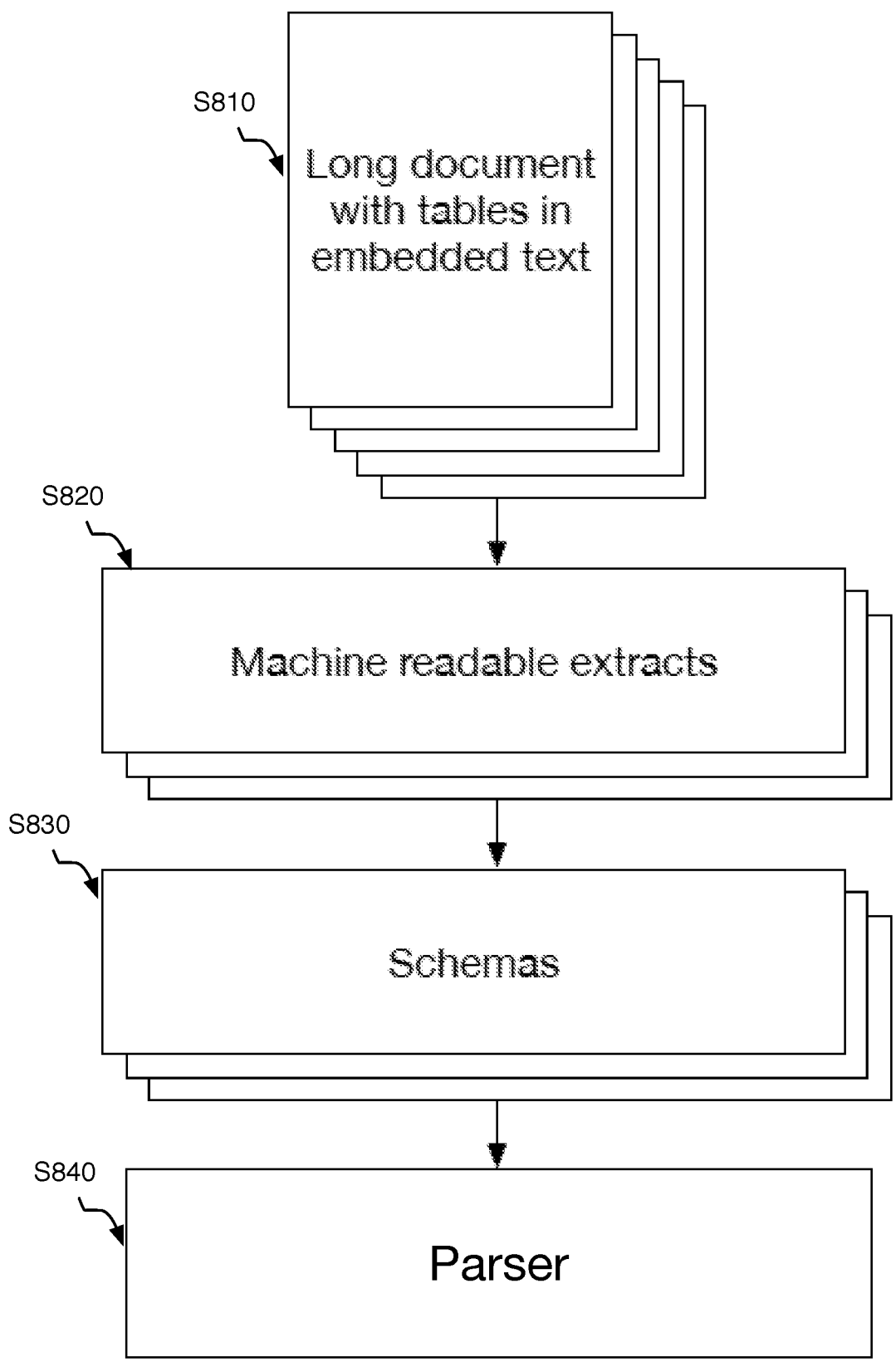
FIG. 8 is a block diagram representation of a method in accordance with embodiments.

FIG. 8 depicts a method 800 for controlling a decisioning system (e.g., 100*a*, 100*b*, 100*c*, 100*d*) to parse opaque data records provided by a first data provider system to identify each data field of each opaque data record (e.g., by using at least one of a data parsing module, e.g., 111 of FIGS. 2A and 2B, and a schema generation module, e.g., 210 of the decisioning system), according to some embodiments. As shown in FIG. 8, the method 800 includes: identifying at least one data dictionary table (e.g., 1202 of FIG. 12B) of the first data provider system (e.g., 131-136) from the first human-readable document, and generating at least one computer-readable data file that includes data of each identified data dictionary table (process S810); validating each computer-readable data file to identify at least one validated dictionary table from among the tables included in the at least one computer-readable data file (process S820); generating a schema file (e.g., 1203 of FIG. 12C) from each validated data dictionary table, each schema file defining a parsing process for parsing at least a portion (e.g., a data blob) of an opaque data record provided by the first data provider system into a set of data fields (process S830); parsing each opaque data record (e.g., 1201 of FIG. 12A) provided by the first data provider system into a set of data fields (e.g., 1204 of FIG. 12D) in accordance with the parsing process defined by the corresponding schema file (process S840).

In some embodiments, a schema generation module (e.g., 210 of FIGS. 2A and 2B) performs the processes S810 to S830. In some embodiments, the schema generation module provides each generated schema file to a data parsing module (e.g., 111), and the data parsing module performs the process S840 by parsing opaque data records provided by data provider systems into a sets of data fields in accordance with the parsing processes defined by the corresponding schema files.

In some embodiments, the first human-readable document is a PDF document, and identifying at least one data dictionary table from the first human-readable document includes using a PDF table extractor (e.g., Tabula, an OCR module, and the like) to extract table data from identified tables of the PDF document. In some embodiments, the PDF table extractor identifies data dictionary tables responsive to receipt of user-input via a user input device. In some embodiments, the PDF table extractor controls display of a rendered representation of the PDF document by a display device, and responsive to user-input received via a user input device that specifies positional information that identifies a location of a data dictionary table within the rendered PDF document displayed by the display device, the PDF table extractor extracts text data from the PDF document that corresponds to the received positional information corresponding to the data dictionary table, and generates at least one computer-readable data file that includes data corresponding to the extracted text data of the identified data dictionary table. In some embodiments, the PDF table extractor extracts the text data of the identified data dictionary table by performing an optical character recognition (OCR) process.

In some embodiments, the PDF table extractor identifies data dictionary tables by automatically recognizing tables of the PDF document. In some embodiments, the PDF table extractor automatically recognizes tables of the PDF document based on data elements of the PDF document that indicate presence of a table. In some embodiments, the PDF table extractor automatically recognizes tables of the PDF document by performing an OCR process. In some embodiments, the PDF table extractor automatically recognizes tables of the PDF document by performing an OCR process, and identifying data resulting from the OCR process that corresponds to a table.

In some embodiments, each computer-readable data file is a comma-separated value (CSV) file.

In some embodiments, the opaque data records (e.g., 1201) provided by the data provider system has a FFR record format, and each opaque data record (e.g., 1201) includes a byte length field, a field indicating a type of the opaque data record, and at least one data field as a single un-delimited string of bytes. In some embodiments, each byte of an opaque data record represents a human-readable character, and the opaque data records do not contain delimiting characters.

In some embodiments, each data dictionary table (e.g., 1202) identifies the bytes of a corresponding opaque data record (e.g., 1201) that correspond to the byte length field, the field indicating a type of the opaque data record, and each data field. In some embodiments, each data dictionary table (e.g., 1202) identifies a data type of the byte length field, data type of the field identifying the type of the opaque data record, and a data type for each data field. FIG. 6 depicts an exemplary data dictionary table for the following 15-byte opaque undelimited character string data record in the FFR format: "OA015001LAY2016". As shown in FIG. 6, the first two bytes ("OA") represent the FFR record type field, which has a "character" data type. The next three bytes ("015") represent the FFR byte length field, which has an "integer" data type. The remaining ten bytes represent three FFR data fields. The first data field ("Record Index") is represented by bytes 6-8 ("001"), and has an "integer" data type. The second data field ("Activity Type") is represented by bytes 9-11 ("LAY"), and has a "character" data type. The third data field ("Year") is represented by bytes 12-15 ("2016"), and has an "integer" data type.

In some embodiments, validating each computer-readable data file to identify at least one validated dictionary table from among the tables included in the at least one computer-readable data file includes: for the data file of each data dictionary table, at least one of: validating that no two fields have overlapping bytes, and validating that all bytes in the contiguous byte string from the first byte identified by the data dictionary to the last byte identified by the data dictionary are assigned to a field of the opaque data record type.

In some embodiments, generating a schema file from each validated data dictionary table, each schema file defining a parsing process for parsing an opaque data record provided by the data provider system into a set of data fields includes: for each validated dictionary table, generating an XML element for each FFR field specified in the dictionary table, and for each FFR field, generating an attribute for the corresponding XML element that identifies the bytes of the opaque data record that corresponds to the FFR field. In some embodiments, generating at least one schema file from the identified at least one data dictionary table includes: for each dictionary table, generating an XML element for each FFR field specified in the dictionary table, and for each FFR field, generating an attribute for the corresponding XML element that identifies the bytes of the opaque data record that corresponds to the FFR field, and generating an attribute for the corresponding XML element that identifies the data type of the opaque data record that corresponds to the FFR field.

In some embodiments, generating a schema file from each validated data dictionary table, each schema file defining a parsing process for parsing an opaque data record provided by the data provider system into a set of data fields includes: for each validated dictionary table, generating a schema in a CSV format as shown in FIG. 12C.

In some embodiments, generating the schema file for each validated data dictionary table includes: for each validated dictionary table, generating a line of characters in a CSV file for each FFR field specified in the dictionary table, and each line of characters contains characters representing the following data elements separated by commas: characters that represent the name of the FFR field; characters that represent the bytes of the opaque data record that corresponds to the FFR field.

In some embodiments, generating the schema file for each validated data dictionary table includes: for each validated dictionary table, generating a line of characters in a CSV file for each FFR field specified in the dictionary table, and each line of characters contains characters representing the following data elements separated by commas: characters that represent the name of the FFR field; characters that represent the bytes of the opaque data record that corresponds to the FFR field; and characters that represent the data type of the data corresponding to the FFR field.

In some embodiments, generating the schema file for each validated data dictionary table includes: for each validated dictionary table, generating a line of characters in a CSV file for each FFR field specified in the dictionary table, and each line of characters contains characters representing the following data elements separated by commas: characters that represent the name of the FFR field; characters that represent the data type of the FFR field; characters that represent the byte of the opaque data record that corresponds to the start of the FFR field; characters that represent the byte of the opaque data record that corresponds to the end of the FFR field.

In some embodiments, generating the schema file for each validated data dictionary table includes: for each validated dictionary table, generating a line of characters in a CSV file for each FFR field specified in the dictionary table, and each line of characters contains characters representing the following data elements separated by commas: characters that represent the name of the FFR field; characters that represent the byte displacement within the opaque data record that corresponds to the start of the FFR field; characters that represent the number of bytes (e.g., byte length) corresponding to the FFR field; and characters that represent the data type of the FFR field.

FIG. 7 depicts an exemplary schema that corresponds to the dictionary table of FIG. 6. As shown in FIG. 7, the schema includes an XML element for each FFR field: "Record Type", "ByteCount", "RecordIndex", "ActivityType", and "Year"). Each XML element of the schema includes a "type" attribute that specifies the corresponding data type, a "begin" attribute that specifies the byte in the opaque data record that corresponds to the first byte of the FFR field, and an "end" attribute that specifies the byte in the opaque data record that corresponds to the last byte of the FFR field.

FIG. 12C depicts an exemplary schema that corresponds to the dictionary table of FIG. 12B. As shown in FIG. 12C, the schema includes a CSV line for each FFR field: "Record Type", "ByteCount", "RecordIndex", "ZipCode", and "CreditScore"). Each line of the schema includes the following information separated by commas: a "field name" attribute that specifies the name of the FFR field, a "type" attribute that specifies the corresponding data type, a "begin" attribute that specifies the byte in the opaque data record that corresponds to the first byte of the FFR field, and an "end" attribute that specifies the byte in the opaque data record that corresponds to the last byte of the FFR field In some embodiments, each schema file specifies the FFR fields of a corresponding opaque data record, and for each FFR field the schema file specifies the bytes of the corresponding record that represent the FFR field. In some embodiments, each schema file specifies the FFR fields of a corresponding opaque data record, and for each FFR field the schema file specifies the bytes of the corresponding record that represent the FFR field and a data type of the FFR field. In some embodiments, the identification of bytes of the opaque data record that correspond to each FFR field defines the parsing process for parsing an opaque data record provided by the data provider system into a set of data fields.

In some embodiments, parsing an opaque data record provided by the data provider system into a set of data fields in accordance with the parsing process defined by the corresponding schema file includes: identifying data fields of the opaque data record by using the schema file which specifies the bytes that correspond to each field of the opaque data record. In some embodiments, parsing an opaque data record provided by the data provider system into a set of data fields in accordance with the parsing process defined by the corresponding schema file includes: identifying a generated schema that corresponds to the opaque data record, and using the identified schema to identify the fields of the opaque data record. In some embodiments, identifying a generated schema that corresponds to the opaque data record includes: identifying a record type of the opaque data record, and identifying the generated schema that corresponds to the identified record type. In some embodiments, the byte (or bytes) of an opaque data record that correspond to the record type are predetermined, and the bytes of the record type of the opaque data record are compared with the record type of each generated schema file to identify a matching schema file.

In some embodiments, identifying a generated schema that corresponds to the opaque data record includes: identifying a record type of the opaque data record from an FFR provided by the data provider system, and identifying the generated schema that corresponds to the identified record type. In some embodiments, the byte (or bytes) of the FFR that correspond to the record type of the opaque data record are predetermined, and the bytes of the record type of the opaque data record are compared with the record type of each generated schema file to identify a matching schema file.

In some embodiments, parsing an opaque data record provided by the data provider system into a set of data fields in accordance with the parsing process defined by the corresponding schema file includes: performing parsing of opaque data records provided by the data provider in accordance with the structure defined by the schema, assigning parsed data of each record of each opaque data record to a particular field name (or variable name, or key value) as defined by the schema (and in some embodiments, assigning a computer data type as defined by the schema).

In some embodiments, the method 800 includes generating a data parsing module (e.g., 111) based on the schema file, and parsing each opaque data record (the process S840) includes the decisioning system using the generated data parsing module to parse an opaque data record provided by the data provider system into a set of data fields. In some embodiments, the method 800 includes generating a data parsing module (e.g., 111) based on the schema file. In some embodiments, generating the data parsing module includes using an automatic parser generator module to generate computer-readable program instructions of the data parsing module based on the schema file.

In some embodiments, generating the data parsing module based on the schema file includes generating machine-executable instructions for parsing an opaque data record of a first type based on a schema file for the first type. In some embodiments, generating machine-executable instructions for parsing the opaque data record of the first type based on the schema file for the first type includes: for each field name in the schema file for the first type: identifying the begin byte and the end byte for the field name as specified by the schema file for the first type, generating at least one machine-executable instruction for extracting data of the opaque data record beginning at the begin byte and ending at the end byte, generating at least one machine-executable instruction for storing the extracted data in association with the field name, and storing each generated machine-executable parsing instruction of the first type in association with the first type. In some embodiments, each machine-executable instruction for storing the extracted data in association with the corresponding field name is an instruction for storing the extracted data in association with corresponding the field name as a key-value pair, wherein the extracted data is the value of the key-value pair and the field name is the key of the key-value pair.

In some embodiments, generating the data parsing module based on the schema file includes generating machine-executable instructions for parsing an opaque data record of a first type based on a schema file for the first type. In some embodiments, generating machine-executable instructions for parsing the opaque data record of the first type based on the schema file (e.g., 1203 of FIG. 12C) for the first type includes: for each field name in the schema file for the first type: identifying a data type of for the field name as specified by the schema file for the first type, identifying the begin byte and the end byte for the field name as specified by the schema file for the first type, generating at least one machine-executable instruction for extracting data of the opaque data record beginning at the begin byte and ending at the end byte, generating at least one machine-executable instruction for storing the extracted data in association with the field name and the identified data type (e.g., as shown in 1204 of FIG. 12D), and storing each generated machine-executable parsing instruction for the first type in association with the first type. In some embodiments, each machine-executable instruction for storing the extracted data in association with the corresponding field name is an instruction for storing the extracted data in association with corresponding the field name as a key-value pair, wherein the extracted data is the value of the key-value pair and the field name is the key of the key-value pair.

In some embodiments, the machine-executable parsing instructions (computer-readable program instructions) include one or more of Ruby, Perl, Python, Java, JavaScript, C, and C++ instructions.

In some implementations, the computer-readable program instructions (machine-executable instructions) are instructions of the Ruby programming language. In some embodiments, parsing each opaque data record (the process S840) includes the decisioning system executing the computer-readable program instructions of the generated data parsing module to parse each opaque data record. In some implementations, the computer-readable program instructions are stored as a Ruby program file that is loaded and executed by the decisioning system to perform the parsing of each opaque data record. In some implementations, the computer-readable program instructions of the data parsing module are stored as a program file that is loaded and executed by the decisioning system to perform the parsing of each opaque data record, and the program file is a program file of any suitable type of programming language (e.g., Ruby, Perl, Python, Java, JavaScript, C, C++, and the like).

In some embodiments, the program instructions of the data parsing module control the decisioning system to identify a record type of the opaque data record, and execute program instructions of the data parsing module that correspond to the generated schema that matches the identified record type. In some embodiments, the byte (or bytes) of an opaque data record that correspond to the record type are predetermined, and the bytes of the record type of the opaque data record are used by the decisioning system to selectively execute program instructions of the data parsing module that correspond to the matching schema file.

In some embodiments, the program instructions of the data parsing module control the decisioning system to identify a record type of the opaque data record from an FFR provided by the data provider system, and execute program instructions of the data parsing module that correspond to the generated schema that matches the identified record type. In some embodiments, the byte (or bytes) of the FFR that correspond to the record type of the opaque data record are predetermined, and the bytes of the record type of the opaque data record are used by the decisioning system to selectively execute program instructions of the data parsing module that correspond to the matching schema file.

As an example of parsing an opaque data record, in a case where a decisioning system parses the opaque data record "OA015001LAY2016" in accordance with the schema defined by FIG. 7, the decisioning system stores the value "OA" as a value of the "Record type" field (or key), stores the value "015" as a value of the "Byte count" field (or key), stores the value "001" as a value of the "Record index" field (or key), stores the value "LAY" as a value of the "Activity type" field (or key), and stores the value "2016" as a value of the "Year" field (or key).

For example, in a case where a decisioning system parses the opaque data record "OA015001LAY2016" in accordance with the schema defined by FIG. 7, the decisioning system stores the value "OA" as a value of the "Record type" field having a "character" data type, stores the value "015" as a value of the "Byte count" field having an "integer" data type, stores the value "001" as a value of the "Record index" field having an "integer" data type, stores the value "LAY" as a value of the "Activity type" field having a "character" data type, and stores the value "2016" as a value of the "Year" field having an "integer" data type.

In some embodiments, the data provider system that provides the opaque data records and the data dictionary is a system of a credit reporting agency (e.g., Equifax, Transunion, Experian), the opaque data records are credit data records, and the data dictionary identifies the data field corresponding to each byte of an opaque data record.

In some embodiments, the method 800 is performed by the decisioning system e.g., 100*a*, 100*b*, 100*c*, 100*d*). In some embodiments, the method 800 is performed by the schema generation module (e.g., 210 of FIGS. 2A and 2B). In some embodiments, the method 800 is performed by a modeling client system (e.g., 141*a*-141*d*). In some embodiments, the method 800 is performed by an entity system (e.g., 151*b*-153*b*, 151*c*, 151*d*-153*d*). In some embodiments, the method 800 is performed by a data provider system (e.g., 131-136). In some embodiments, the method 800 is performed by a decision information consuming system (e.g., 121*a*, 121*b*-123*b*, 121*c*, 121*d*-123*d*).

Figure 12D:
FIG. 12D is a depiction of exemplary parsed data generated for a credit report opaque data record, in accordance with embodiments.

In some embodiments, parsing each opaque data record provided by a first data provider system (e.g., 131-136) into a set of data fields in accordance with the parsing process defined by the corresponding schema file includes: generating a set of key-value pairs (or representation thereof) (e.g., 1204 of FIG. 12D) for each data field of the set of data fields. In some embodiments, parsing each opaque data record provided by the first data provider system into a set of data fields in accordance with the parsing process defined by the corresponding schema file includes: assigning a data type to each data field of the set of data fields (e.g., as shown in FIG. 12D). In some embodiments, responsive to a decisioning request for decision information by a consuming system (e.g., 121a, 121b-123b, 121c, 121d-123d), the decisioning system (e.g., 100a-100d) accesses at least one opaque data record (e.g., 1201 of FIG. 12A) of the first data provider system and parses the accessed opaque data record into a set of key-value pairs (or representation thereof). In some embodiments, the decisioning system generates decision information from the set of key-value pairs (or representation thereof), and the decisioning system provides the generated decision information to the consuming system as a response to the decisioning request provided by the consuming system. In some embodiments, the decisioning request is a request in accordance with an API (e.g., 160c, 160d) of the decisioning system. In some embodiments, the decisioning request specifies data to be used by the decisioning system to generate the decision information.

In some embodiments, the consuming system is a system of a lending system, the lending system receives borrower data from a borrower device, the lending system includes the borrower data in the decisioning request, the decisioning system uses the borrower data to generate the decision information, and the first data provider system includes at least a credit agency system. In some embodiments, the credit agency system includes at least one of a Transunion system, an Equifax system, an Experian system and a LexisNexis system. In some embodiments, the decisioning system generates decision information from the set of key-value pairs (or representation thereof) in real-time with respect to the decisioning request.

In some embodiments, the decisioning system parses the accessed opaque data record (e.g., 1201 of FIG. 12A) in real-time with respect to the decisioning request. In some embodiments, the decisioning system generates the decision information within 40 seconds from receipt of the decisioning request.

In some embodiments, the decisioning system selects the first data provider system based on the decisioning request. In some embodiments, the decisioning system selects a plurality of data provider systems based on the decisioning request, and the first data provider system is a system of the selected plurality of data provider systems. In some embodiments, the decisioning system generates a schema file for two or more of the selected plurality of data provider systems by parsing a human-readable document for each of the two or more data provider systems.

In some embodiments, the decisioning system generates decision rationale information from the set of key-value pairs (or representation thereof), and the decisioning system provides the generated decision rationale information to the consuming system. In some embodiments, the decision rationale information is provided as a response to a decisioning rationale request provided by the consuming system. In some embodiments, the decision rationale information is adverse action information to be used in an adverse action letter in accordance with the Fair Credit Reporting Act. In some embodiments, the decision rationale information is generated asynchronously with respect to the decisioning request. In some embodiments, the decision rationale information is generated at least one hour after receipt of the decisioning request.

Computer Architecture

Figure 9:
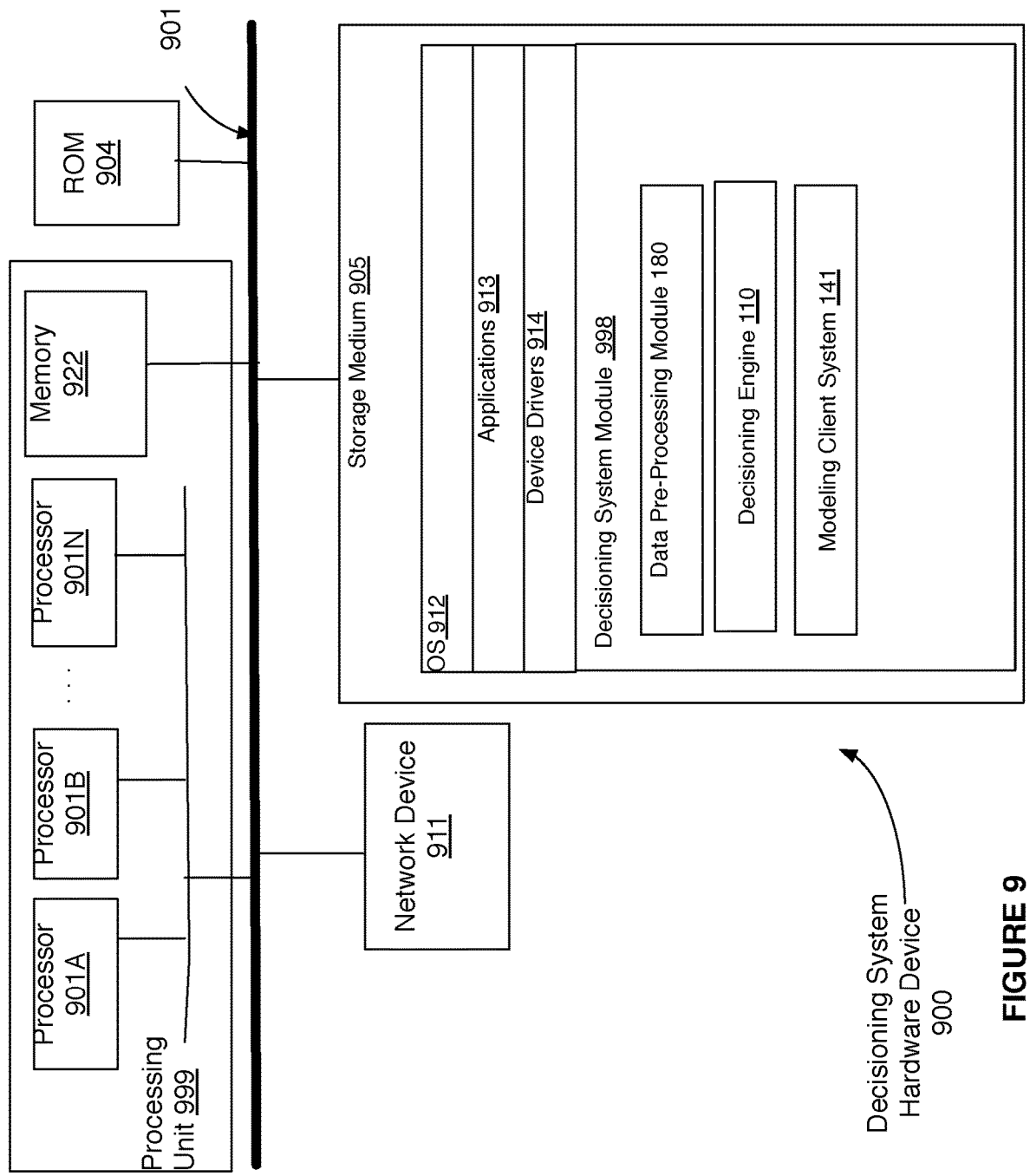
FIG. 9 is an architecture diagram of a decisioning system in accordance with embodiments.
Figure 10:
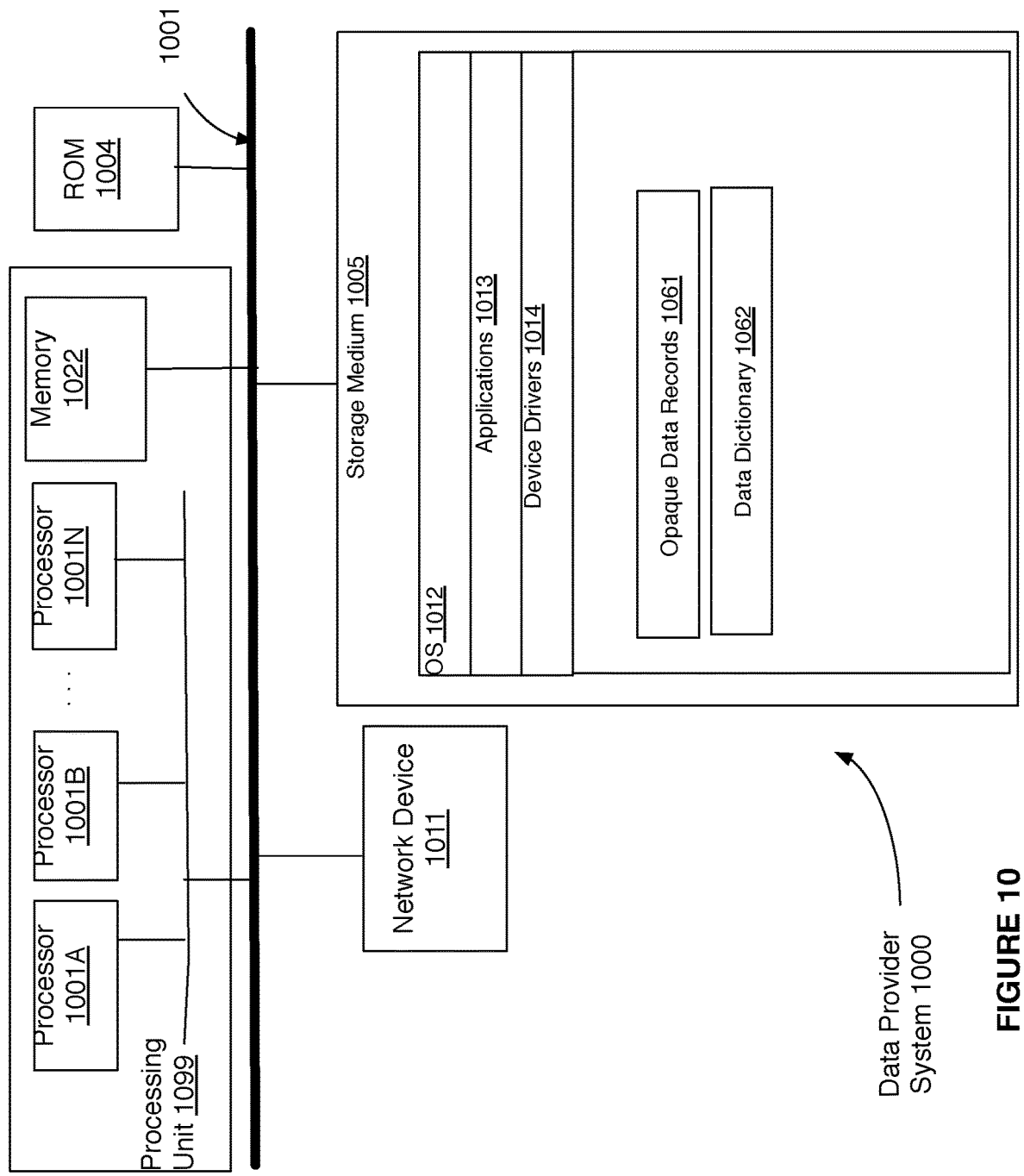
FIG. 10 is an architecture diagram of a data provider system in accordance with embodiments.

FIG. 9 is an architecture diagram of a decisioning system (e.g., 100a-100d) in accordance with embodiments. FIG. 10 is an architecture diagram of a data provider system (e.g., 131-136) in accordance with embodiments. FIG. 11 is an architecture diagram of an entity system (e.g., 151b-153b, 151c, 151d-153d) in accordance with embodiments.

FIG. 9

FIG. 9 is an architecture diagram of a decisioning system (e.g., 100a-100d) in accordance with embodiments. In some embodiments, the decisioning system is implemented as a single hardware server device. In some embodiments, the decisioning system is implemented as a plurality of hardware devices similar to the hardware server device 900 of FIG. 9. In some embodiments, the decisioning system is implemented as a plurality of hardware devices including at least one hardware device similar to the hardware server device 900 of FIG. 9.

The hardware server device 900 includes a bus 901 that interfaces with the processors 901A-901N, the main memory (e.g., a random access memory (RAM)) 922, a read only memory (ROM) 904, a processor-readable storage medium 905, and a network device 911. In some implementations, the hardware server device 900 includes at least one of a display device and a user input device. In some implementations, the device 900 includes one processor (e.g., 901A).

The processors 901A-901N may take many forms, such as one or more of an ARM processor, an X86 processor, a GPU (Graphics Processing Unit), and the like. In some embodiments, at least one of the processors 901A-901N includes at least one arithmetic logic unit (ALU) that supports a SIMD (Single Instruction Multiple Data) system that provides native support for multiply and accumulate operations.

In some implementations, the hardware server device 900 includes at least one of a central processing unit (processor), a GPU, and a multi-processor unit (MPU).

The processors 901A-901N and the main memory 922 form a processing unit 999. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more of a decisioning system module, a data pre-processing module, a decisioning engine, and a modeling client system.

In some embodiments, the processing unit 999 includes at least one arithmetic logic unit (ALU) that supports a SIMD (Single Instruction Multiple Data) system that provides native support for multiply and accumulate operations.

In some implementations, the network adapter device 911 provides one or more wired or wireless interfaces for exchanging data and commands between the device 900 and other devices, such as a hardware data provider system (e.g., 131-136), and an entity system (e.g., 151b-153b, 151c, 151d-153d). Such wired and wireless interfaces include, for example, a universal serial bus (USB) interface, Bluetooth interface, Wi-Fi interface, Ethernet interface, near field communication (NFC) interface, and the like.

Machine-executable instructions in software programs (such as an operating system, application programs, and device drivers) are loaded into the memory 922 (of the processing unit 999) from the processor-readable storage medium 905, the ROM 904 or any other storage location. During execution of these software programs, the respective machine-executable instructions are accessed by at least one of processors 901A-901N (of the processing unit 999) via the bus 901, and then executed by at least one of processors 901A-901N. Data used by the software programs are also stored in the memory 922, and such data is accessed by at least one of processors 901A-901N during execution of the machine-executable instructions of the software programs. The processor-readable storage medium 905 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like.

The processor-readable storage medium 905 includes machine-executable instructions (and related data) for an operating system 912, software programs 913, device drivers 914, and a decisioning system module 998. In some implementations, the decisioning system module 998 includes one or more of the data pre-processing module 180, the decisioning engine 110, and the modeling client system 141. In some implementations, the decisioning system module 998 includes the data pre-processing module 180, the decisioning engine 110, and the modeling client system 141.

In some implementations, the data pre-processing module 180 includes the type coercion module 112.

FIG. 10

FIG. 10 is an architecture diagram of a data provider system (e.g., 131-136) in accordance with embodiments.

In some embodiments, the data provider system is implemented as a single hardware server device 1000. In some embodiments, the data provider system is implemented as a plurality of hardware devices similar to the hardware server device 1000 of FIG. 10.

The hardware server device 1000 includes a bus 1001 that interfaces with the processors 1001A-1001N, the main memory (e.g., a random access memory (RAM)) 1022, a read only memory (ROM) 1004, a processor-readable storage medium 1005, and a network device 1011. In some implementations, the hardware server device 1000 includes at least one of a display device and a user input device. In some implementations, the device 1000 includes one processor (e.g., 1001A).

The processors 1001A-1001N may take many forms, such as one or more of an ARM processor, an X86 processor, a GPU (Graphics Processing Unit), and the like. In some implementations, the hardware server device 1000 includes at least one of a central processing unit (processor), a GPU, and a multi-processor unit (MPU).

The processors 1001A-1001N and the main memory 1022 form a processing unit 1099. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip).

The network adapter device 1011 provides one or more wired or wireless interfaces for exchanging data and commands between the device 1000 and other devices, such as a the decisioning system (e.g., 100a-100d). Such wired and wireless interfaces include, for example, a universal serial bus (USB) interface, Bluetooth interface, Wi-Fi interface, Ethernet interface, near field communication (NFC) interface, and the like.

Machine-executable instructions in software programs (such as an operating system, application programs, and device drivers) are loaded into the memory 1022 (of the processing unit 1099) from the processor-readable storage medium 1005, the ROM 1004 or any other storage location. During execution of these software programs, the respective machine-executable instructions are accessed by at least one of processors 1001A-1001N (of the processing unit 1099) via the bus 1001, and then executed by at least one of processors 1001A-1001N. Data used by the software programs are also stored in the memory 1022, and such data is accessed by at least one of processors 1001A-1101N during execution of the machine-executable instructions of the software programs. The processor-readable storage medium 1005 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like.

The processor-readable storage medium 1005 includes machine-executable instructions (and related data) for an operating system 1012, software programs 1013, and device drivers 1014. In some implementations, the storage medium 1005 includes opaque data records 1061. In some implementations, the storage medium 1005 includes a data dictionary 1062

FIG. 11

FIG. 11 is an architecture diagram of a hardware device 1100 of an entity system (e.g., 151b-153b, 151c, 151d-153d) in accordance with embodiments.

In some embodiments, the entity system is implemented as a single hardware server device 1100. In some embodiments, the entity system is implemented as a plurality of hardware devices similar to the hardware server device 1100 of FIG. 11.

The hardware server device 1100 includes a bus 1101 that interfaces with the processors 1101A-1101N, the main memory (e.g., a random access memory (RAM)) 1122, a read only memory (ROM) 1104, a processor-readable storage medium 1105, and a network device 1111. In some implementations, the hardware server device 1100 includes at least one of a display device and a user input device. In some implementations, the device 1100 includes one processor (e.g., 1101A).

The processors 1101A-1101N may take many forms, such as one or more of an ARM processor, an X86 processor, a GPU (Graphics Processing Unit), and the like. In some implementations, the hardware server device 1100 includes at least one of a central processing unit (processor), a GPU, and a multi-processor unit (MPU).

The processors 1101A-1101N and the main memory 1122 form a processing unit 1199. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip).

The network adapter device 1111 provides one or more wired or wireless interfaces for exchanging data and commands between the device 1100 and other devices, such as a decisioning system (e.g., 110a-100d), a parser generation system, and a parser generation platform system. Such wired and wireless interfaces include, for example, a universal serial bus (USB) interface, Bluetooth interface, Wi-Fi interface, Ethernet interface, near field communication (NFC) interface, and the like.

Machine-executable instructions in software programs (such as an operating system, application programs, and device drivers) are loaded into the memory 1122 (of the processing unit 1199) from the processor-readable storage medium 1105, the ROM 1104 or any other storage location. During execution of these software programs, the respective machine-executable instructions are accessed by at least one of processors 1101A-1101N (of the processing unit 1199) via the bus 1101, and then executed by at least one of processors 1101A-1101N. Data used by the software programs are also stored in the memory 1122, and such data is accessed by at least one of processors 1101A-1101N during execution of the machine-executable instructions of the software programs. The processor-readable storage medium 1105 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like.

The processor-readable storage medium 1105 includes machine-executable instructions (and related data) for an operating system 1112, software programs 1113, and device drivers 1114. In some implementations, the storage medium 1105 includes machine-executable instructions (and related data) for an entity system module 1198. In some implementations, the entity system module 1198 includes machine-executable instructions (and related data) for a decision information consuming system 1161 (e.g., a consuming system similar to the consuming systems described herein). In some embodiments, the entity system module 1198 includes machine-executable instructions (and related data) for a decisioning engine (e.g., a decisioning engine similar to the decisioning engines 110a-d of FIGS. 1A-D). In some embodiments, the entity system module 1198 includes machine-executable instructions (and related data) for a data parsing module (e.g., a data parsing module similar to the data parsing module 111 of FIGS. 2A and 2B). In some embodiments, the entity system module 1198 includes machine-executable instructions (and related data) for a decisioning engine (e.g., a decisioning engine similar to the decisioning engines 110a-d of FIGS. 1A-D), the entity system module 1198 includes machine-executable instructions (and related data) for a data parsing module (e.g., a data parsing module similar to the data parsing module 111 of FIGS. 2A and 2B), and the instructions of the decisioning engine include instructions that when executed by the entity system 1100, control the entity system 1100 to execute the instructions of the data parsing module. In some embodiments, the decisioning system (e.g., 100, 100a-d) provides the instructions of the data parsing module to the entity system 1100. In some embodiments, a parser generation platform system provides the instructions of the data parsing module to the entity system 1100. In some embodiments, a parser generation system provides the instructions of the data parsing module to the entity system 1100. In some embodiments, one of a decisioning system (e.g., 100, 100a-d), parser generation platform system, and a parser generation system provides updated data parsing module instructions to the entity system 1100.

Method

A method including: at a decisioning system: parsing opaque data records provided by a first data provider system to identify each data field of each opaque data record by: parsing a first human-readable document that includes at least one data dictionary table of the first data provider system to identify each data dictionary table of the human-readable document, and generating at least one computer-readable data file that includes data of each identified data dictionary table; validating each computer-readable data file to identify at least one validated dictionary table from among the tables included in the at least one computer-readable data file; generating a schema file from each validated data dictionary table, each schema file defining a parsing process for parsing an opaque data record provided by the first data provider system into a set of data fields.

In some embodiments, parsing each opaque data record provided by the first data provider system into a set of data fields in accordance with the parsing process defined by the corresponding schema file includes: generating a set of key-value pairs for each data field of the set of data fields.

In some embodiments, parsing each opaque data record provided by the first data provider system into a set of data fields in accordance with the parsing process defined by the corresponding schema file includes: assigning a data type to each data field of the set of data fields.

In some embodiments, responsive to a decisioning request for decision information by a consuming system, the decisioning system accesses at least one opaque data record of the first data provider system and parsing the accessed opaque data record into a set of key-value pairs.

In some embodiments, the decisioning system generates decision information from the set of key-value pairs, and the decisioning system provides the generated decision information to the consuming system as a response to the decisioning request provided by the consuming system.

In some embodiments, the decisioning request is a request in accordance with an API of the decisioning system.

In some embodiments, the decisioning request specifies data to be used by the decisioning system to generate the decision information.

In some embodiments, the consuming system is a system of a lending system, the lending system receives borrower data from a borrower device, the lending system includes the borrower data in the decisioning request, the decisioning system uses the borrower data to generate the decision information, and the first data provider system includes at least a credit agency system.

In some embodiments, the credit agency system includes at least one of a Transunion system, an Equifax system, an Experian system and a LexisNexis system.

In some embodiments, the decisioning system generates decision information from the set of key-value pairs in real-time with respect to the decisioning request.

In some embodiments, the decisioning system parses the accessed opaque data record in real-time with respect to the decisioning request.

In some embodiments, the decisioning system selects the first data provider system based on the decisioning request.

In some embodiments, the decisioning system selects a plurality of data provider systems based on the decisioning request, and the first data provider system is a system of the selected plurality of data provider systems.

In some embodiments, the decisioning system generates a schema file for two or more of the selected plurality of data provider systems by parsing a human-readable document for each of the two or more data provider systems.

In some embodiments, the decisioning system generates the decision information within 40 seconds from receipt of the decisioning request.

In some embodiments, the decisioning system generates decision rationale information from the set of key-value pairs, and the decisioning system provides the generated decision rationale information to the consuming system.

In some embodiments, the decision rationale information is provided as a response to a decisioning rationale request provided by the consuming system.

In some embodiments, the decision rationale information is adverse action information to be used in an adverse action letter in accordance with the Fair Credit Reporting Act. In some embodiments, the decision rationale information is generated asynchronously with respect to the decisioning request.

Method

A method including: a parser generation system (e.g., 100b, 100c, 100d) extracting data dictionary information (e.g., 1202 of FIG. 12B) for each type of opaque data record of a first data provider system (e.g., 131-136) from a first human-readable document of the first data provider system; the parser generation system generating parsing instructions for each type of opaque data record based on the extracted data dictionary information, wherein for each type, the parsing instructions are parsing instructions for parsing an opaque data record of the type into a set of data fields, wherein each opaque data record is a data record of the first data provider system; for each type, providing the parsing instructions to a first entity system (e.g., 151b-153b, 151c, 151d-153d) external to the parser generation system.

In some embodiments, the parser generation system is a multi-tenant platform system, the first entity system is associated with a first platform account of the platform system, and the parser generation system provides the opaque data parsing instructions to a second entity system that is associated with a second platform account.

In some embodiments, responsive to updated data dictionary information for a first type of opaque data record, the parser generation system: generates updated parsing instructions for the first type based on the updated data dictionary information; and provides the updated opaque data parsing instructions to the first entity system and the second entity system.

In some embodiments, generating parsing instructions includes: for each type of opaque data record: for each field specified in the extracted data dictionary information for the type of opaque data record, generating at least one parsing instruction for controlling the first entity system to extract bytes of an opaque data record of the type that correspond to the field, as specified by the data dictionary information, and storing the extracted bytes in association with a field name of the field, wherein the data dictionary information for the field specifies the field name of the field and the corresponding bytes of the type of opaque data record.

In some embodiments, generating parsing instructions includes: for each type of opaque data record: for each field specified in the extracted data dictionary information for the type of opaque data record, generating at least one parsing instruction for controlling the first entity system to extract bytes of an opaque data record of the type that correspond to the field, as specified by the data dictionary information, and storing the extracted bytes as a value of a key-value pair having a field name of the field as a key of the key-value pair, wherein the data dictionary information for the field specifies the field name of the field and the corresponding bytes of the type of opaque data record. In some embodiments, parser generation system is included in a decisioning system (e.g., the systems 100a-100d of FIGS. 1A-1D).

In some embodiments, the platform system provides the opaque data parsing instructions for each type to the first entity system via an HTTP callback of the first entity system, and the platform system provides the opaque data parsing instructions for each type to the second entity system via an HTTP callback of the second entity system.

In some embodiments, the platform system provides the opaque data parsing instructions for each type to the first entity system via a secure network connection between the platform system and the first entity system, and the platform system provides the opaque data parsing instructions for each type to the second entity system via a secure network connection between the platform system and the second entity system.

In some embodiments, the platform system provides the opaque data parsing instructions for each type to the first entity system via an API of the platform system (e.g., 160c, 160d), and the platform system provides the opaque data parsing instructions for each type to the second entity system via the API of the platform system.

In some embodiments, the first entity system is a system of a first entity, and wherein the second entity system is a system of a different second entity.

In some embodiments, the first entity system is constructed to: responsive to the first entity system accessing an opaque data record from the first data provider system, execute the opaque data parsing instructions corresponding to a type of the accessed opaque data record to generate a first set of data fields (e.g., key-value pairs, data tables, and the like), wherein each data field of the opaque data record is represented by the generated first set of data fields; generate decision information from the first set of data fields in real-time with respect to a first request for decision information received by the first entity system.

In some embodiments, the second entity system is constructed to: responsive to the second entity system accessing an opaque data record from the first data provider system, execute the opaque data parsing instructions corresponding to a type of the accessed opaque data record to generate a first set of data fields, wherein each data field of the opaque data record is represented by the generated first set of data fields; generate decision information from the first set of data fields in real-time with respect to a first request for decision information received by the second entity system.

In some embodiments, the parser generation system generating parsing instructions includes: validating the extracted data dictionary information and generating the parsing instructions based on the validated extracted data dictionary information.

In some embodiments, responsive to updated data dictionary information for at least a first type of opaque data record, the parser generation system generates updated parsing instructions for at least the first type based on the updated data dictionary information and provides the updated opaque data parsing instructions to the first entity system and the second entity system.

In some embodiments, the first entity system is constructed to: responsive to the first entity system accessing an opaque data record of the first type from the first data provider system, execute the updated opaque data parsing instructions provided by the platform system, and, the second entity system is constructed to: responsive to the second entity system accessing an opaque data record of the first type from the first data provider system, execute the updated opaque data parsing instructions provided by the platform system.

In some embodiments, the platform system identifies updated data dictionary information.

In some embodiments, identifying updated data dictionary information includes: the parser generation system storing the extracting data dictionary information as first data dictionary information; the parser generation system extracting second data dictionary information for each type of a plurality of types of opaque data records of a first data provider system from a second human-readable document of the first data provider system; the parser generation system determining at least one difference between the first data dictionary information and the second data dictionary information; the parser generation system identifying the second data dictionary information as updated data dictionary information responsive to determining the at least one difference.

In some embodiments, the parsing instructions generated by the parser generation system are a first type of instructions (e.g., one of Ruby, Perl, Python, Java, JavaScript, C, and C++ instructions).

In some embodiments, the parser generation system generates parsing instructions of a second type (e.g., a different one of Ruby, Perl, Python, Java, JavaScript, C, and C++ instructions) for each of the plurality of types of opaque data records based on the extracted data dictionary information, wherein for each type, the parsing instructions of the second type are parsing instructions for parsing an opaque data record of the type into a set of data fields, wherein each opaque data record is a data record of the first data provider system; for each type, the platform system provides the parsing instructions of the second type to the second entity system external to the parser generation system, wherein the second entity system is associated with a second platform account of the platform system.

In some embodiments, the parser generation system automatically generates the parsing instructions for each of the plurality of types of opaque data records based on the extracted data dictionary information.

In some embodiments, the parser generation system automatically generates the parsing instructions based on the extracted data dictionary information without human interaction. By virtue of generating a first type of instructions for a first entity system and a second, different type of instructions for second entity system, the platform system can provide parsing instructions that can be executed by plural entity systems having different computing system configurations.

Method

A method including: a parser generation system (e.g., 100*b*, 100*c*, 100*d*) storing information of a first data dictionary table (e.g., 1202 of FIG. 12B) included in a first human-readable document of a first data provider system (e.g., 131-136), wherein the first data dictionary table is for opaque data of a first type; the parser generation system comparing the stored information of the first data dictionary table with information of the first data dictionary table included in an updated version of the first human-readable document to determine whether the first data dictionary table (e.g., 1202 of FIG. 12B) has been updated; responsive to a determination that the first data dictionary table has been updated, the parser generation system generating computer-readable updated opaque data parsing instructions based on the information of the first data dictionary table included in the updated version of the first human-readable document, wherein the updated opaque data parsing instructions are updated parsing instructions for parsing an opaque data record of the first type provided by the first data provider system into a set of data fields; providing the updated opaque data parsing instructions to a first entity system external to the parser generation system via an API, wherein, the first entity system is constructed to: responsive to the first entity system accessing an opaque data record of the first type from the first data provider system, execute the updated opaque data parsing instructions to generate a first set of data fields that correspond to the accessed opaque data record of the first type; and generate decision information from the first set of data fields in real-time with respect to a first request for decision information received by the first entity system.

Method

A method including: a multi-tenant parser generation platform system (e.g., 100*b*, 100*c*, 100*d*, 180*b*, 180*c*, 180*d*, and the like) accessing a first human-readable document of a first data provider system (e.g., 131-136), wherein the first human-readable document includes a first data dictionary table (e.g., 1202 of FIG. 12B) for opaque data of the first data provider system that has a first type; the platform system extracting computer-readable data dictionary information of the first data dictionary table from the accessed first human-readable document; the platform system generating a computer-readable opaque data first schema file (e.g., 1203 of FIG. 12C) from the extracted computer-readable data dictionary information, the first schema file defining a parsing process for parsing an opaque data record of the first type provided by the first data provider system into a set of data fields, the first schema file specifying each field of the opaque data record of the first type; the platform system generating computer-readable first opaque data parsing instructions based on the opaque data first schema file, wherein the first opaque data parsing instructions are parsing instructions for parsing an opaque data record of the first type provided by the first data provider system into a set of data fields; the platform system providing the first opaque data parsing instructions to a first entity system (e.g., 151*b*-153*b*, 151*c*, 151*d*-153*d*) external to the platform system, the first entity system being associated with a first platform account of the platform system; wherein the first entity system is constructed to: responsive to a first request for decision information, access a first opaque data record (e.g., 1201 of FIG. 12A) of the first type from the first data provider system; responsive to the first entity system accessing the first opaque data record, execute the first opaque data parsing instructions to generate a first set of data fields (e.g., 1204 of FIG. 12D) that correspond to the accessed first opaque data record of the first type; and generate decision information from the first set of data fields in real-time with respect to the first request for decision information.

In some embodiments, the first request is a request for decision information for a specified first user, the first opaque data record is a data record for the first user, and for each field of the opaque data record of the first type, the first schema file specifies a field name and the bytes of the opaque data record of the first type that correspond to the field name.

In some embodiments, the method further includes: the platform system identifying a second data dictionary table of the first human-readable document, wherein the second data dictionary table is for opaque data of a second type; the platform system generating computer-readable second opaque data parsing instructions based on the identified second data dictionary table, wherein the second opaque data parsing instructions are parsing instructions for parsing an opaque data record of the second type provided by the first data provider system into a set of data fields; and the platform system providing the second opaque data parsing instructions to the first entity system, wherein the first entity system is constructed to: responsive to the first entity system accessing a second opaque data record of the second type, execute the second opaque data parsing instructions to generate a second set of data fields that correspond to the accessed second opaque data record of the second type; and generate decision information from the second set of data fields in real-time with respect to one of the first request for decision information and another request for decision information.

In some embodiments, the first human-readable document is a Portable Document Format (PDF) document. In some embodiments, the first human-readable document includes the first data dictionary table, the second data dictionary table, and additional information. In some embodiments, the additional information is different from data dictionary information.

In some embodiments, the platform system accesses the first human-readable document from the first data provider system via a network, and the platform system and the first data provider system are systems of different entities. In some embodiments, the platform system accesses the first human-readable document from a storage device of the platform system.

In some embodiments, the method further includes: the platform system accessing an updated first human-readable document of the first data provider system; the platform system extracting computer-readable data dictionary information of the first data dictionary table of the accessed updated first human-readable document; the platform system comparing the data dictionary information of the first data dictionary table of the accessed first human-readable document with the data dictionary information of the first data dictionary table of the accessed updated first human-readable document; responsive to a determination that the data dictionary information of the first data dictionary table of the accessed first human-readable document is different from the data dictionary information of the first data dictionary table of the accessed updated first human-readable document, the platform system: generating a computer-readable updated opaque data first schema file from the data dictionary information of the first data dictionary table of the accessed updated first human-readable document, generating computer-readable updated first opaque data parsing instructions based on the updated opaque data first schema file, and providing the updated first opaque data parsing instructions to the first entity system, wherein the first entity system is constructed to: responsive to the first entity system accessing a third opaque data record of the first type, execute the updated first opaque data parsing instructions to generate a third set of data fields that correspond to the accessed third opaque data record of the first type; and generate decision information from third set of data fields in real-time.

In some embodiments, the platform system accesses the updated first human-readable document from the first data provider system via a network, the first data provider system is external to the platform system, and the data provider system is a system of an entity that is different from an entity of the platform system.

In some embodiments, the method further includes: the platform system monitoring the first data provider system for the updated first human-readable document via the network, wherein the platform system accesses the updated first human-readable document of the first data provider system responsive to identifying the updated first human-readable document during the monitoring.

In some embodiments, the platform system accesses the updated first human-readable document from a storage device of the platform system. In some embodiments, the platform system provides the first opaque data parsing instructions and the updated first opaque data parsing instructions to the first entity system by using an API system (e.g., 160*d*) of the platform system.

In some embodiments, the platform system provides the first opaque data parsing instructions and the updated first opaque data parsing instructions to the first entity system via an HTTP callback of the first entity system.

In some embodiments, the platform system identifies each data dictionary table of the first human-readable document and generates opaque data parsing instructions for each identified data dictionary table, wherein each data dictionary table corresponds to at least one of a plurality of types of opaque data records of the first data provider system.

In some embodiments, the method further includes: the platform system providing the generated opaque data parsing instructions for each identified data dictionary table to the first entity system.

In some embodiments, the method further includes: the platform system providing the opaque data parsing instructions for each identified data dictionary table to a different second entity system that is associated with a second platform account.

In some embodiments, the second entity system is constructed to execute the first opaque data parsing instructions to generate a set of data fields that correspond to an opaque data record of the first type that is accessed by the second entity system. In some embodiments, the method further includes: the platform system validating the extracted computer-readable data dictionary information, and the platform system generates the computer-readable first opaque data parsing instructions based on the validated extracted computer-readable data dictionary information.

In some embodiments, the first opaque data parsing instructions are a first type of instructions (e.g., one of Ruby, Perl, Python, Java, JavaScript, C, and C++ instructions), and the method further includes: the platform system generating opaque data parsing instructions of a second type (e.g., different one of Ruby, Perl, Python, Java, JavaScript, C, and C++ instructions) for each of the plurality of types of opaque data records based on the first human-readable document, wherein for each type, the opaque data parsing instructions of the second type are parsing instructions for parsing an opaque data record of the type into a set of data fields, wherein each opaque data record is a data record of the first data provider system; for each type of opaque data record, the platform system providing the opaque data parsing instructions of the second type to the second entity system.

In some embodiments, the platform system automatically generates the computer-readable opaque data parsing instructions for each of the plurality of types of opaque data records based on the first human-readable document.

In some embodiments, the platform system automatically generates the computer-readable opaque data parsing instructions based on the first human-readable document without human interaction.

In some embodiments, the platform system generating computer-readable first opaque data parsing instructions based on the opaque data first schema file includes: generating at least one parsing instruction for controlling the first entity system to: for each field specified in the first schema file (e.g., 1203 of FIG. 12): extract each byte of an opaque data record of the first type that corresponds to the field, as specified by the first schema file, and store each extracted byte in association with a field name of the field (e.g., as shown in FIG. 12D), wherein the first schema file specifies the field name of the field and each corresponding byte of the first type of opaque data record.

In some embodiments, the platform system generating computer-readable first opaque data parsing instructions based on the opaque data first schema file includes: generating at least one parsing instruction for controlling the first entity system to: determine a record type of an opaque data record and responsive to a determination that the determined record type is the first type, for each field specified in the first schema file (e.g., 1203 of FIG. 12): extract each byte of the opaque data record that corresponds to the field, as specified by the first schema file, and store each extracted byte in association with a field name of the field (e.g., as shown in FIG. 12D), wherein the first schema file specifies the field name of the field and each corresponding byte of the first type of opaque data record.

In some embodiments, the platform system generating computer-readable first opaque data parsing instructions based on the opaque data first schema file includes: generating at least one parsing instruction for controlling the first entity system to: for each field specified in the first schema file: extract each byte of an opaque data record of the first type that corresponds to the field, as specified by the first schema file, and store each extracted byte as a value of a key-value pair having a field name of the field as a key of the key-value pair, wherein the first schema file specifies the field name of the field and each corresponding byte of the first type of opaque data record.

In some embodiments, the platform system generating computer-readable first opaque data parsing instructions based on the opaque data first schema file includes: generating at least one parsing instruction for controlling the first entity system to: determine a record type of an opaque data record and responsive to a determination that the determined record type is the first type, for each field specified in the first schema file (e.g., 1203 of FIG. 12): extract each byte of the opaque data record that corresponds to the field, as specified by the first schema file, and store each extracted byte as a value of a key-value pair having a field name of the field as a key of the key-value pair, wherein the first schema file specifies the field name of the field and each corresponding byte of the first type of opaque data record.

In some embodiments, the at least one parsing instruction for controlling the first entity system to determine a record type of an opaque data record is constructed to control the first entity system to extract each byte of the opaque data record that corresponds to the record type. In some embodiments, the begin byte and the end byte of the record type field is the same for each type of opaque data record of the first data provider system. In some embodiments, the first byte of each opaque data record of the first data provider system corresponds to the record type. In some embodiments, the first two bytes of each opaque data record of the first data provider system corresponds to the record type.

In some embodiments, the platform system generating computer-readable second opaque data parsing instructions includes: generating at least one parsing instruction for controlling the first entity system to: for each field specified in the second data dictionary table: extract each byte of an opaque data record of the second type that corresponds to the field, as specified by the second data dictionary table, and store each extracted byte in association with a field name of the field, wherein the second data dictionary table specifies the field name of the field and each corresponding byte of the second type of opaque data record.

In some embodiments, the platform system generating computer-readable second opaque data parsing instructions includes: generating at least one parsing instruction for controlling the first entity system to: responsive to a determination that a record type of an opaque data record is the second type, for each field specified in the second data dictionary table: extract each byte of the opaque data record that corresponds to the field, as specified by the second data dictionary table, and store each extracted byte in association with a field name of the field, wherein the second data dictionary table specifies the field name of the field and each corresponding byte of the second type of opaque data record.

In some embodiments, the platform system generating computer-readable second opaque data parsing instructions includes: generating at least one parsing instruction for controlling the first entity system to: for each field specified in the second data dictionary table: extract each byte of an opaque data record of the first type that corresponds to the field, as specified by the second data dictionary table, and store each extracted byte as a value of a key-value pair having a field name of the field as a key of the key-value pair, wherein the second data dictionary table specifies the field name of the field and each corresponding byte of the second type of opaque data record.

In some embodiments, the platform system generating computer-readable second opaque data parsing instructions includes: generating at least one parsing instruction for controlling the first entity system to: responsive to a determination that a record type of an opaque data record is the second type, for each field specified in the second data dictionary table: extract each byte of the opaque data record that corresponds to the field, as specified by the second data dictionary table, and store each extracted byte as a value of a key-value pair having a field name of the field as a key of the key-value pair, wherein the second data dictionary table specifies the field name of the field and each corresponding byte of the second type of opaque data record.

In some embodiments, one of the first opaque data parsing instructions and the second opaque data parsing instructions include instructions to control the first entity system to determine that a record type of an opaque data record is the second type by: extracting each byte of the opaque data record that corresponds to the record type, and comparing the data of each extracted byte with data that represents the second record type. In some embodiments, in a case where the data of each extracted byte matches the data that represents the second record type, the opaque data record is of the second type. In some embodiments, the begin byte and the end byte of the record type field is the same for each type of opaque data record of the first data provider system. In some embodiments, the first byte of each opaque data record of the first data provider system corresponds to the record type. In some embodiments, the first two bytes of each opaque data record of the first data provider system corresponds to the record type.

In some embodiments, the at least one parsing instruction for controlling the first entity system to determine a record type of an opaque data record is constructed to: control the first entity system to extract each byte of the opaque data record that specifies the record type, and compare the data of each extracted byte with data representing each type of opaque data record to determine a matching type of opaque data record.

In some embodiments, the platform system extracts the data representing each type of opaque data record from the first human-readable document of the first data provider system Machines Systems and methods of embodiments and variations thereof can be embodied and/or implemented at least in part as a machine configured to receive a computer-readable medium storing computer-readable instructions. The instructions are preferably executed by computer-executable components. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

CONCLUSION

As a person skilled in the art will recognize from the previous detailed description and from the figures and claims, modifications and changes can be made to the preferred embodiments of the disclosure without departing from the scope of this disclosure defined in the following claims.

What is claimed is:

1. A method comprising:
a multi-tenant parser generation platform system accessing a first human-readable document of a first data provider system, wherein the first human-readable document includes a human-readable first data dictionary table for opaque data of the first data provider system that has a first type, wherein the opaque data of the first data provider system includes fixed field (FFR) records, wherein each FFR record is an un-delimited string of bytes that includes bytes representing a byte length of the record, a record type of the record, and at least one data field of the record, wherein for at least the first type of FFR record, the first data dictionary table identifies record bytes corresponding to each of the byte length, the record type, and each data field, and wherein the first data dictionary table excludes FFR records;
the platform system extracting computer-readable data dictionary information of the first data dictionary table from the accessed first human-readable document, wherein the computer-readable data dictionary information identifies record bytes corresponding to each of the byte length, the record type, and each data field of FFR records of the first type;
the platform system generating a computer-readable first FFR schema file from the extracted computer-readable data dictionary information, the first FFR schema file defining a parsing process for parsing FFR records of the first type provided by the first data provider system into a set of data fields, the first FFR schema file identifying each field of the FFR record of the first type;
the platform system generating computer-readable first FFR parsing instructions based on the first FFR schema file, wherein the first FFR parsing instructions are parsing instructions for parsing an FFR record of the first type provided by the first data provider system into a set of data fields;
the platform system providing the first FFR parsing instructions to a first entity system external to the platform system, the first entity system being associated with a first platform account of the platform system;
the platform system monitoring the first data provider system for an updated data dictionary table included in a human-readable document stored at the first data provider system;
responsive to the platform system identifying the updated data dictionary table, the platform system:
automatically accessing the updated data dictionary table from the first data provider system, via a network, and
using the accessed updated data dictionary table to automatically generate updated first FFR parsing instructions for parsing FFR data records of the first type that are provided by the first data provider system, wherein the first FFR parsing instructions are instructions for parsing FFR data records of the first type in accordance with the updated data dictionary table; and
providing the updated first FFR parsing instructions to the first entity system, wherein the first entity system is constructed to:
responsive to a first request for decision information, access a first FFR record of the first type from the first data provider system;
responsive to the first entity system accessing the first FFR record, execute the updated first FFR parsing instructions to generate a first set of data fields that correspond to the accessed first FFR record of the first type; and
generate decision information from the first set of data fields in real-time with respect to the first request for decision information,
wherein the first data provider system is a hardware server device of a credit reporting agency,
wherein the opaque data is credit report data, and
wherein the first data dictionary table is a data dictionary for credit report data provided by the credit reporting agency,
wherein FFR data records of the first type that are provided by the first data provider system exclude human-readable data dictionary tables.

2. The method of claim 1,
wherein the first request is a request for decision information for a specified first user,
wherein the first FFR record is a data record for the first user, and
wherein for each field of the FFR record of the first type, the first FFR schema file specifies a field name and the bytes of the FFR record of the first type that correspond to the field name.

3. The method of claim 2, further comprising:
the platform system identifying a second data dictionary table of the first human-readable document, wherein the second data dictionary table is for FFR records of a second type;
the platform system generating computer-readable second FFR parsing instructions based on the identified second data dictionary table, wherein the second FFR parsing instructions are parsing instructions for parsing an FFR record of the second type provided by the first data provider system into a set of data fields; and
the platform system providing the second FFR parsing instructions to the first entity system,
wherein the first entity system is constructed to:
responsive to the first entity system accessing a second FFR record of the second type, execute the second FFR parsing instructions to generate a second set of data fields that correspond to the accessed second FFR record of the second type; and
generate decision information from the second set of data fields in real-time with respect to one of the first request for decision information and a second request for decision information.

4. The method of claim 3, wherein the first human-readable document is a Portable Document Format (PDF) document.

5. The method of claim 4, wherein the first human-readable document includes the first data dictionary table, the second data dictionary table, and additional information.

6. The method of claim 5, wherein the additional information is different from data dictionary information.

7. The method of claim 3, wherein the platform system accesses the first human-readable document from the first data provider system via a network, and wherein the platform system and the first data provider system are systems of different entities.

8. The method of claim 3,
wherein the platform system identifying the updated data dictionary table comprises:
the platform system accessing an updated first human-readable document of the first data provider system;
the platform system extracting a data dictionary table from the accessed updated first human-readable document; and
the platform system comparing the first data dictionary table of the accessed first human-readable document with the extracted data dictionary table of the accessed updated first human-readable document
wherein the platform system automatically generating updated first FFR parsing instructions comprises:
responsive to a determination that the first data dictionary table is different from the extracted data dictionary table of the accessed updated first human-readable document, the platform system:
generating a computer-readable updated first FFR schema file from extracted data dictionary table of the accessed updated first human-readable document; and
generating computer-readable updated first FFR parsing instructions based on the updated first FFR schema file.

9. The method of claim 8, wherein the platform system accesses the updated first human-readable document from the first data provider system via a network, wherein the first data provider system is external to the platform system, and wherein the data provider system is a system of an entity that is different from an entity of the platform system.

10. The method of claim 8, wherein the platform system accesses the updated first human-readable document from a storage device of the platform system.

11. The method of claim 8, wherein the platform system provides the first FFR parsing instructions and the updated first FFR parsing instructions to the first entity system by using an API system of the platform system.

12. The method of claim 8, wherein the platform system provides the first FFR parsing instructions and the updated first FFR parsing instructions to the first entity system via an HTTP callback of the first entity system.

13. The method of claim 11,
wherein the platform system identifies each data dictionary table of the first human-readable document and generates FFR parsing instructions for each identified data dictionary table,
wherein each data dictionary table corresponds to at least one of a plurality of types of FFR records of the first data provider system, and the method further comprising: the platform system providing the generated FFR parsing instructions for each identified data dictionary table to the first entity system.

14. The method of claim 13,
further comprising: the platform system providing the FFR parsing instructions for each identified data dictionary table to a different second entity system that is associated with a second platform account,
wherein the second entity system is constructed to execute the first FFR parsing instructions to generate a set of data fields that correspond to a FFR record of the first type that is accessed by the second entity system.

15. The method of claim 13,
further comprising, the platform system validating the extracted computer-readable data dictionary information of the first data dictionary table,
wherein the platform system generates the computer-readable first FFR parsing instructions based on the validated extracted computer-readable data dictionary information of the first data dictionary table.

16. The method of claim 15,
wherein the first FFR parsing instructions are a first type of instructions,
the method further comprising:
the platform system generating FFR parsing instructions of a second type for each of the plurality of types of opaque data records based on the first human-readable document, wherein for each type of FFR record, the FFR parsing instructions of the second type are parsing instructions for parsing a FFR record of the type of FFR record into a set of data fields, wherein each FFR record is a data record of the first data provider system;
for each type of FFR record, the platform system providing the FFR parsing instructions of the second type to the second entity system.

17. The method of claim 3,
wherein the platform system generating computer-readable first FFR parsing instructions based on the first FFR schema file comprises:
generating at least one parsing instruction for controlling the first entity system to determine a record type of a FFR record, wherein each FFR record includes at least one byte of data that specifies the record type, and wherein the same bytes of each FFR record of the first data provider system specify the record type; and
generating at least one parsing instruction for controlling the first entity system to: responsive to a determination that the determined record type is the first type:
for each field specified in the first FFR schema file:
extract each byte of a FFR record of the first type that corresponds to the field, as specified by the first FFR schema file, and
store each extracted byte in association with a field name of the field, wherein the first FFR schema file specifies the field name of the field and each corresponding byte of the first type of FFR record,
wherein the platform system generating computer-readable second FFR parsing instructions comprises:
generating at least one parsing instruction for controlling the first entity system to: responsive to a determination that the determined record type is the second type:
for each field specified in the second data dictionary table: extract each byte of a FFR record of the second type that corresponds to the field, as specified by the second data dictionary table, and store each extracted byte in association with a field name of the field, wherein the second data dictionary table specifies the field name of the field and each corresponding byte of the second type of FFR record, and wherein the at least one parsing instruction for controlling the first entity system to determine a record type of a FFR record is constructed to: control the first entity system to extract each byte of the FFR record that specifies the record type, and compare the data of each extracted byte with data representing each type of FFR record to determine a matching type of FFR record.

18. The method of claim 17, wherein the platform system extracts the data representing each type of FFR record from the first human-readable document of the first data provider system.

19. A method comprising:

a multi-tenant parser generation platform system monitoring, via a network, an external hardware server device of a credit reporting agency for an updated human-readable data dictionary table included in a Portable Document Format (PDF) document stored at the hardware server device, wherein the data dictionary table is a data dictionary for opaque credit report data records that have an FFR (fixed field record) format and that is provided by the credit reporting agency separately from the human-readable data dictionary table, and wherein the data dictionary table excludes opaque credit report data records;

responsive to the platform system identifying the updated human-readable data dictionary table, the platform system:

automatically accessing the updated human-readable data dictionary table from the hardware server device of the credit reporting agency, via the network, and using the accessed updated human-readable data dictionary table to automatically generate first FFR (fixed field record) parsing instructions for parsing opaque credit report data records provided by the hardware server device of the credit reporting agency, wherein the FFR parsing instructions are instructions for parsing the opaque credit report data records in accordance with the data dictionary table; and providing the first FFR parsing instructions to a first system, wherein the platform system automatically provides the first system with updated FFR parsing instructions in response to identifying additional updated human-readable data dictionary tables stored at the hardware server device of the credit reporting agency, wherein opaque credit report data records are accessed from the hardware server device of the credit reporting agency separately from the human-readable data dictionary tables, which are included in PDF documents, and wherein the opaque credit report data records exclude human-readable data dictionary tables.

20. The method of claim 19, further comprising: with the first system:

receiving the first FFR parsing instructions;

responsive to a first request for decision information, accessing a first opaque credit report data record from the hardware server device of the credit reporting agency, wherein the accessed first opaque credit report data record excludes the human-readable data dictionary table;

responsive to accessing the first opaque credit report data record, executing the received first FFR parsing instructions to generate a first set of data fields that correspond to the accessed first opaque credit report data record; and generating decision information from the first set of data fields in real-time with respect to the first request for decision information.

* * * * *